(12) United States Patent
Yang et al.

(10) Patent No.: US 10,981,230 B2
(45) Date of Patent: *Apr. 20, 2021

(54) POROUS ALUMINUM COMPLEX AND METHOD OF PRODUCING POROUS ALUMINUM COMPLEX

(71) Applicant: MITSUBISHI MATERIALS CORPORATION, Tokyo (JP)

(72) Inventors: Ji-bin Yang, Kitamoto (JP); Koichi Kita, Kitamoto (JP); Toshihiko Saiwai, Kitamoto (JP); Koji Hoshino, Kitamoto (JP); Jun Katoh, Kitamoto (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 484 days.

This patent is subject to a terminal disclaimer.

(21) Appl. No.: 15/306,252

(22) PCT Filed: Jun. 1, 2015

(86) PCT No.: PCT/JP2015/065778
§ 371 (c)(1),
(2) Date: Oct. 24, 2016

(87) PCT Pub. No.: WO2015/182783
PCT Pub. Date: Dec. 3, 2015

(65) Prior Publication Data
US 2017/0043401 A1   Feb. 16, 2017

(30) Foreign Application Priority Data

May 30, 2014 (JP) .............................. JP2014-113195
May 27, 2015 (JP) .............................. JP2015-107795

(51) Int. Cl.
*B22F 7/00* (2006.01)
*C22C 21/00* (2006.01)
(Continued)

(52) U.S. Cl.
CPC ............... *B22F 7/002* (2013.01); *B22F 3/11* (2013.01); *B22F 7/004* (2013.01); *B32B 15/016* (2013.01);
(Continued)

(58) Field of Classification Search
None
See application file for complete search history.

(56) References Cited

U.S. PATENT DOCUMENTS 4,042,163 A   8/1977   Schladitz
5,788,737 A   8/1998   Wakiyama et al.
(Continued)

FOREIGN PATENT DOCUMENTS

CA   1176490 A    10/1984
CN   87107184 A    8/1988
(Continued)

OTHER PUBLICATIONS

Tadrist et al., "About the use of fibrous materials in compact heat exchangers", Jan. 2004, Experimental Thermal and Fluid Science, vol. 28 Issues 2-3, pp. 193-199. (Year: 2004).*
(Continued)

*Primary Examiner* — Xiaobei Wang
(74) *Attorney, Agent, or Firm* — Locke Lord LLP

(57) ABSTRACT

A high quality porous aluminum body, which has excellent joint strength between the porous aluminum body and the aluminum bulk body, and a method of producing the porous aluminum complex, are provided.
The porous aluminum complex (10) includes: a porous aluminum body (30) made of aluminum or aluminum alloy; and an aluminum bulk body (20) made of aluminum or aluminum alloy, the porous aluminum body (30) and the aluminum bulk body (20) being joined to each other. The junction (15) between the porous aluminum body (30) and
(Continued)

the aluminum bulk body (20) includes a Ti—Al compound. It is preferable that pillar-shaped protrusions (32) projecting toward the outside are formed on outer surfaces of one of or both of the porous aluminum body (30) and the aluminum bulk body (20), and the pillar-shaped protrusions (32) include the junction (15).

12 Claims, 13 Drawing Sheets

(51) Int. Cl.
| | | |
|---|---|---|
| B22F 3/11 | (2006.01) | |
| B32B 15/01 | (2006.01) | |
| B32B 15/20 | (2006.01) | |
| C22C 32/00 | (2006.01) | |
| C22C 1/08 | (2006.01) | |
| B22F 7/04 | (2006.01) | |
| C22C 21/12 | (2006.01) | |
| C22C 14/00 | (2006.01) | |
| B22F 1/00 | (2006.01) | |

(52) U.S. Cl.
CPC .............. *B32B 15/20* (2013.01); *C22C 14/00* (2013.01); *C22C 21/00* (2013.01); *C22C 21/12* (2013.01); *B22F 1/0011* (2013.01); *B22F 7/04* (2013.01); *B22F 2301/052* (2013.01); *B22F 2998/10* (2013.01); *B22F 2999/00* (2013.01); *B32B 2305/026* (2013.01); *C22C 1/08* (2013.01); *Y10T 428/12764* (2015.01)

(56) References Cited

U.S. PATENT DOCUMENTS

| | | | |
|---|---|---|---|
| 6,391,250 B1 | 5/2002 | Wolfsgruber et al. | |
| 2003/0232124 A1 | 12/2003 | Medlin et al. | |
| 2006/0196641 A1 | 9/2006 | Hong et al. | |
| 2006/0198753 A1 | 9/2006 | Hong et al. | |
| 2007/0077165 A1 | 4/2007 | Hou et al. | |
| 2007/0084587 A1 | 4/2007 | Huang et al. | |
| 2007/0089860 A1 | 4/2007 | Hou et al. | |
| 2009/0202812 A1* | 8/2009 | Schaeffler | B22F 3/1125 428/312.2 |
| 2009/0269521 A1 | 10/2009 | Tuma | |
| 2010/0181048 A1 | 7/2010 | Hwang et al. | |
| 2010/0294475 A1 | 11/2010 | Rush et al. | |
| 2011/0127013 A1 | 6/2011 | Kawamura et al. | |
| 2012/0094142 A1 | 4/2012 | Hoshino et al. | |
| 2012/0135142 A1* | 5/2012 | Yang | B22F 3/1125 427/247 |
| 2014/0186652 A1 | 7/2014 | Poggi | |

FOREIGN PATENT DOCUMENTS

| | | |
|---|---|---|
| CN | 1373233 A | 10/2002 |
| CN | 101294776 A | 10/2008 |
| CN | 102365143 A | 2/2012 |
| CN | 102438778 A | 5/2012 |
| CN | 102458725 A | 5/2012 |
| CN | 102717181 A | 10/2012 |
| DE | 4426627 A1 | 2/1995 |
| EP | 2939762 A1 | 11/2015 |
| EP | 3144082 A1 | 3/2017 |
| EP | 3165864 A1 | 5/2017 |
| JP | 51-045358 A | 4/1976 |
| JP | 55-024937 A | 2/1980 |
| JP | 56-077301 A | 6/1981 |
| JP | 56-149363 A | 11/1981 |
| JP | 61-048566 B2 | 10/1986 |
| JP | 62-050742 B2 | 10/1987 |
| JP | 63-140783 A | 6/1988 |
| JP | H03-110045 A | 5/1991 |
| JP | 04-037658 A | 2/1992 |
| JP | 08-145592 A | 6/1996 |
| JP | 08-325661 A | 12/1996 |
| JP | 2006-300395 A | 11/2006 |
| JP | 2007-056302 A | 3/2007 |
| JP | 2007-147194 A | 6/2007 |
| JP | 2008-020864 A | 1/2008 |
| JP | 2009-256788 A | 11/2009 |
| JP | 2009-263182 A | 11/2009 |
| JP | 2010-255089 A | 11/2010 |
| JP | 2010-280951 A | 12/2010 |
| JP | 2010-283042 A | 12/2010 |
| JP | 2011-007365 A | 1/2011 |
| JP | 2011-023430 A | 2/2011 |
| JP | 2011-049023 A | 3/2011 |
| JP | 2011-077269 A | 4/2011 |
| JP | 2011-214046 A | 10/2011 |
| JP | 2014-141733 A | 8/2014 |
| JP | 5594445 B1 | 9/2014 |
| JP | 2014-194074 A | 10/2014 |
| JP | 2014-194075 A | 10/2014 |
| JP | 5633658 B2 | 12/2014 |
| JP | 2015-151609 A | 8/2015 |
| WO | 2012/160275 A1 | 11/2012 |
| WO | 2015/174541 A1 | 11/2015 |
| WO | 2015/174542 A1 | 11/2015 |
| WO | 2015/182783 A1 | 12/2015 |

OTHER PUBLICATIONS

Bo Wang et al., "Effects of Pulse Current on Transient Liquid Phase (TLP) Diffusion Bonding of SiCp/2024Al Composites Sheet Using Mixed Al, Cu, and Ti Powder Interlayer", Metallurgical and MaterialsTransactions A, Springer-Verlag, New York, vol. 43, No. 9, Jul. 10, 2012, pp. 3039-3042.
Search Report dated Jun. 26, 2018, issued for the European patent applictaion No. 15799359.3.
Search Report dated Dec. 21, 2017, issued for the European patent application No. 15799359.3.
Office Action dated May 11, 2017, issued for the Chinese patent application No. 201580012200.1 and English translation thereof.
International Search Report dated Sep. 1, 2015, issued for PCT/JP2015/065778 and English trnalation thereof.
International Search Report dated Dec. 8, 2015, issued for PCT/JP2015/080358 and English translation thereof. (cited in the related application, U.S. Appl. No. 15/522,310).
Search Report dated Mar. 22, 2018, issued for the European patent application No. 15855571.4. (cited in the related application, U.S. Appl. No. 15/522,310).
Office Action dated Jul. 18, 2018, issued for the Chinese patent application No. 201580058206.2 and a partial translation of the search report. (cited in the related application, U.S. Appl. No. 15/522,310).
Office Action dated May 8, 2019, issued for U.S. Appl. No. 15/522,310.
Internatinal Search Report dated Sep. 1, 2015, issued for PCT/JP2015/069095. (cited in the related application, U.S. Appl. No. 15/322,507).
Notice of Allowance dated Oct. 3, 2017, issued for the Japanese patent application No. 2014-137156 and English translation thereof. (cited in the related application, U.S. Appl. No. 15/322,507).
Office Action dated Mar. 2, 2018, issued for the Chinese patent application No. 201580032177.2 and English translation thereof. (cited in the related application, U.S. Appl. No. 15/322,507).
Office Action dated Aug. 24, 2018 issued for corresponding Chinese Patent Application No. 201580032177.2 (cited in the related application, U.S. Appl. No. 15/322,507).
Office Action dated Jun. 7, 2018, issued for U.S. Appl. No. 15/322,507.
Office Action dated Nov. 19, 2018, issued for U.S. Appl. No. 15/322,507.
Office Action dated Mar. 19, 2019, issued for U.S. Appl. No. 15/322,507.

(56) References Cited

OTHER PUBLICATIONS

Office Action dated Jul. 29, 2019, issued for U.S. Appl. No. 15/322,507.

\* cited by examiner

POROUS ALUMINUM COMPLEX AND METHOD OF PRODUCING POROUS ALUMINUM COMPLEX

TECHNICAL FIELD

The present invention relates to a porous aluminum complex, in which a porous aluminum body made of aluminum or aluminum alloy; and an aluminum bulk body made of aluminum or aluminum alloy are joined to each other, and a method of producing the porous aluminum complex.

BACKGROUND ART

The above-described porous aluminum complex is used as electrodes and current collectors in various batteries; parts of heat exchangers; sound deadening parts; filters; shock-absorbing parts; and the like, for example.

For example, a heat-transfer member in which a metallic sintered material (porous aluminum body) of a three-dimensional network structure and a metal part of the same material (aluminum bulk body) are integrally sintered is proposed in Patent Literature 1 (PTL 1).

In addition, a laminated type evaporator made of aluminum is disclosed in Patent Literature 2 (PTL 2). In the laminated type evaporator disclosed in PTL 2, a porous layer (porous aluminum body) is formed on the heat transfer surface of the refrigerant flow passage (aluminum bulk body) to improve efficiency of heat transfer.

In PTL 1, the metallic sintered material (porous aluminum sintered body) of the three-dimensional network structure is formed by a method, in which adhesive is applied on the skeleton of the three-dimensional network structure made of the material destroyed by fire by heating; and metal powder-like material is deposited thereon, or the like. In addition, the metal part (aluminum bulk body) and the metal sintered body (porous aluminum body) are bonded: by applying a metal powder between the metal part (aluminum bulk body) and the metal sintered material (porous aluminum body) after mixing with adhesive; and by integrally sintering thereof.

In PTL 2, the porous layer (porous aluminum body) is formed by brazing the metal powder on the heat-transfer surface of the refrigerant flow passage (aluminum bulk body)

CITATION LIST

Patent Literature

PTL 1: Japanese Unexamined Patent Application, First Publication No. H08-145592 (A)
PTL 2: Japanese Examined Patent Application, Second Publication No. S62-050742 (A)

SUMMARY OF INVENTION

Technical Problem

When the porous aluminum body and the aluminum bulk body are integrally sintered by using the aluminum powder as described in PTL 1, bonding of the aluminum powder is inhibited by the oxide film formed on the surfaces of the porous aluminum body; the aluminum bulk body; and the aluminum powder. Because of this, there is the problem that sufficient joint strength cannot be obtained. In addition, when the porous aluminum body is formed by sintering integrally by utilizing the three-dimensional network structure made of material destroyed by fire by heating, the shrinkage factor of the formed body during sintering becomes too high. Because of this, it is unlikely that the porous aluminum body having excellent dimension accuracy can be produced.

In addition, when the porous aluminum body and the aluminum bulk body are joined by brazing as described in PTL 2, there is a problem that sufficient joint strength cannot be obtained as well. Particularly, in the case where the temperature is raised, the brazing material melts preferentially. Thus, there is a problem that it cannot be used under the high-temperature condition. Moreover, it is likely that the porosity of the porous aluminum body is reduced due to penetration of the melted aluminum into the porous aluminum body during brazing.

The present invention is made under the circumstances described above. The purpose of the present invention is to provide a high quality porous aluminum complex, which has excellent joint strength between the porous aluminum body and the aluminum bulk body, and the method of producing the porous aluminum complex.

Solution to Problem

In order to achieve the above-mentioned purpose by solving the technical problems, the present invention has an aspect configured as described below.

A porous aluminum complex including: a porous aluminum body made of aluminum or aluminum alloy; and an aluminum bulk body made of aluminum or aluminum alloy, the porous aluminum body and the aluminum bulk body being joined to each other, wherein a junction between the porous aluminum body and the aluminum bulk body includes a Ti—Al compound.

According the porous aluminum complex of the present invention configured as described above, the junction between the porous aluminum body and the aluminum bulk body includes the Ti—Al compound. Thus, the joint strength between the porous aluminum body and the aluminum bulk body is significantly improved.

In addition, the diffusion migration of the aluminum is suppressed by the Ti—Al compound. Thus, penetration of the melted aluminum into the porous aluminum body can be suppressed to obtain sufficient porosity in the porous aluminum body.

In the porous aluminum complex of the present invention, a plurality of pillar-shaped protrusions projecting toward an outside may be formed on outer surfaces of one of or both of the porous aluminum body and the aluminum bulk body, and the pillar-shaped protrusions may include the junction.

In this case, the porous aluminum body and the aluminum bulk body are bonded through the pillar-shaped protrusions formed on the outer surfaces of the porous aluminum body and the aluminum bulk body in the structure. Thus, sufficient porosity can be obtained in the porous aluminum body.

In addition, in the porous aluminum complex of the present invention, the Ti—Al compound may be $Al_3Ti$.

In this case, the junction between the porous aluminum body and the aluminum bulk body includes $Al_3Ti$ as the Ti—Al compound. Thus, the joint strength between the porous aluminum body and the aluminum bulk body can be further improved.

In addition, in the porous aluminum complex of the present invention, the junction may further include a eutectic element compound including a eutectic element capable of eutectic reaction with Al.

In this case, it is understood that this eutectic element compound is formed by reaction between reactions between: aluminum of the porous aluminum body and the aluminum bulk body; and the eutectic element. By having the eutectic element interposing therebetween in this manner, locations having a lowered melting point appear locally in the aluminum porous aluminum body and the aluminum bulk body. In the locations having the lowered melting point, thick junctions are likely to be formed. As a result, joint strength between the porous aluminum body and the aluminum bulk body can be further improved.

[First Paragraph]

In addition, in the porous aluminum complex of the present invention, the porous aluminum body may be formed by sintering a plurality of aluminum substrates, and a substrate junction, in which the aluminum substrates are bonded to each other, may include a Ti—Al compound.

In this case, diffusion migration of aluminum is suppressed since the junction of the aluminum substrates includes the Ti—Al compound. Therefore, voids can be maintained between the aluminum substrates; and a porous aluminum sintered compact having high porosity can be obtained.

In addition, in the porous aluminum complex of the present invention, the aluminum substrates may be made of any one of or both of aluminum fibers and an aluminum powder.

In the case where the aluminum fibers are used as the aluminum substrates, the voids are likely to be held during bonding of the aluminum fibers through the substrate junction; and porosity tends to be increased. Accordingly, the porosity of the porous aluminum sintered compact can be controlled by: using the aluminum fibers and the aluminum powder as the aluminum substrates; and adjusting their mixing ratios.

In addition, in the porous aluminum complex of the present invention, a porosity of the porous aluminum body may be in a range of 30% or more and 90% or less.

In the porous aluminum complex configures as described above, it is possible to provide a porous aluminum complex with the porous aluminum body having an optimal porosity depending on the application since the porosity is controlled in the range of 30% or more and 90% or less.

Another aspect of the present invention is a method of producing a porous aluminum complex in which a porous aluminum body and an aluminum bulk body are bonded to each other, the method including the steps of: heating the porous aluminum body and the aluminum bulk body after interposing a titanium powder made of any one of or both of a metal titanium power and a titanium hydride powder between the porous aluminum body and the aluminum bulk body; and bonding the porous aluminum body and the aluminum bulk body through pillar-shaped projections after forming the plurality of the pillar-shaped protrusions projecting toward an outside on outer surfaces of one of or both of the porous aluminum body and the aluminum bulk body.

In the method of producing a porous aluminum complex configured as described above, the porous aluminum body and the aluminum bulk body are melted in the vicinity of surfaces thereof during heating the porous aluminum body and the aluminum bulk body. However, since the oxide film is formed on the surfaces of the porous aluminum body and the aluminum bulk body, the melted aluminum is retained by the oxide film. In the part where the titanium powder grains are adhered, the oxide files are destroyed by the reaction with titanium; the melted aluminum inside spouts out; and the spouted out melted aluminum forms a high-melting point compound by reacting with titanium to be solidified. Because of this, the pillar-shaped protrusions projecting toward the outside are formed on the outer surfaces of the porous aluminum body and the aluminum bulk body.

Then, though the pillar-shaped protrusions formed on one of or both of the outer surfaces of the porous aluminum body and the aluminum bulk body, the porous aluminum body and the aluminum bulk body are bonded. Thus, the porous aluminum complex with excellent joint strength can be obtained. In addition, the penetration of the melted aluminum in the porous aluminum body is suppressed, and sufficient porosity can be obtained in the porous aluminum body.

In addition, in the method of producing a porous aluminum complex of the present invention, a eutectic element powder made of a eutectic element capable of eutectic reaction with Al may be interposed between the porous aluminum body and the aluminum bulk body in addition to the titanium powder.

In this case, the melting points of the porous aluminum body and the aluminum bulk body are lowered locally on the part with the interposing grain of the eutectic element powder, since the grain of the eutectic element powder made of the eutectic element capable of eutectic reaction with Al interposes between the porous aluminum body and the aluminum bulk body on the surfaces of the aluminum substrates. Accordingly, the pillar-shaped protrusions are formed under the condition with a relatively low temperature and the temperature condition during sintering can be set at a low temperature. Therefore, even in the case where the porous aluminum body and the aluminum bulk body made of aluminum alloys having low melting points are used, the porous aluminum complex can be constituted. Furthermore, the pressure of the melted aluminum spouting out to the outside from the inside of the oxide film after breakage of the oxide film by the reaction with titanium is reduced since the melted aluminum is formed in the low temperature condition. Thus, the thick junctions between the aluminum substrates are likely to be formed. As a result, the joint strength between the porous aluminum body and the aluminum bulk body can be improved significantly.

In addition, in the method of producing a porous aluminum complex of the present invention, the porous aluminum body may be formed by sintering a plurality of aluminum substrates, and formation of the porous aluminum body and bonding the porous aluminum body and the aluminum bulk body may be performed by: forming an aluminum raw material for sintering by adhering the titanium powder on outer surfaces of the aluminum substrates; contacting the aluminum raw material for sintering and the aluminum bulk body; and sintering the aluminum raw material for sintering and the aluminum bulk body by heating.

In this case, the porous aluminum body and the aluminum bulk body can be integrally sintered, the titanium powder being interposed between the porous aluminum body and the aluminum bulk body during formation of the porous aluminum sintered body by sintering the aluminum raw material for sintering, on the outer surfaces of aluminum substrates of which the titanium power is adhered. Thus, the porous aluminum complex, in which the porous aluminum body and the aluminum bulk body are reliably joined, can be obtained.

In the method of producing a porous aluminum complex of the present invention, a content amount of the titanium powder in the aluminum raw material for sintering may be set in a range of 0.01 mass % or more and 20 mass % or less.

In this case, since the content amount of the titanium powder is set to 0.01 mass % or more and 20 mass % or less, the pillar-shaped protrusions are formed with an appropriate distance therebetween on the outer surfaces of the porous aluminum body and the aluminum bulk body. Thus, the porous aluminum body and the aluminum bulk body can be bonded reliably; and sufficient joint strength can be obtained. In addition, the porous aluminum body with sufficient strength and high porosity can be obtained.

In the method of producing a porous aluminum complex of the present invention, the titanium powder may be interposed between the porous aluminum body and the aluminum bulk body by applying a titanium mixture, in which the titanium powder and a binder is mixed, on the outer surfaces of one of or both of the porous aluminum body and the aluminum bulk body.

In this case, the titanium power can be interposed between the porous aluminum body and the aluminum bulk body reliably. Thus, the porous aluminum body and the aluminum bulk body can be joined reliably.

In the method of producing a porous aluminum complex of the present invention, an application amount of the titanium mixture applied on the outer surfaces of one of or both of the porous aluminum body and the aluminum bulk body may be set in a range of 0.0005 g/cm$^2$ or more and 0.05 g/cm$^2$ or less based on a titanium amount. In this case, since the application amount of the titanium mixture is set in the range of 0.0005 g/cm$^2$ or more and 0.05 g/cm$^2$ or less based on a titanium amount, the pillar-shaped protrusions are formed with an appropriate distance therebetween on the outer surfaces of the porous aluminum body and the aluminum bulk body. Thus, the porous aluminum body and the aluminum bulk body can be bonded reliably; and sufficient joint strength can be obtained.

In addition, the titanium mixture may include a eutectic element powder capable of eutectic reaction with Al.

Advantageous Effects of Invention

According to the present invention, a high quality porous aluminum body, which has excellent joint strength between the porous aluminum body and the aluminum bulk body, and a method of producing the porous aluminum complex, are provided.

DESCRIPTION OF EMBODIMENTS

The porous aluminum complex, which is an embodiment of the present invention, is explained below in reference to the attached drawings.

First Embodiment

First, the porous aluminum complex 10, which is the first embodiment of the present invention, is explained. The porous aluminum complex 10 has the structure in which the porous aluminum body made of aluminum or aluminum alloy; and the aluminum bulk body made of aluminum or aluminum alloy, are joined.

Figure 1:
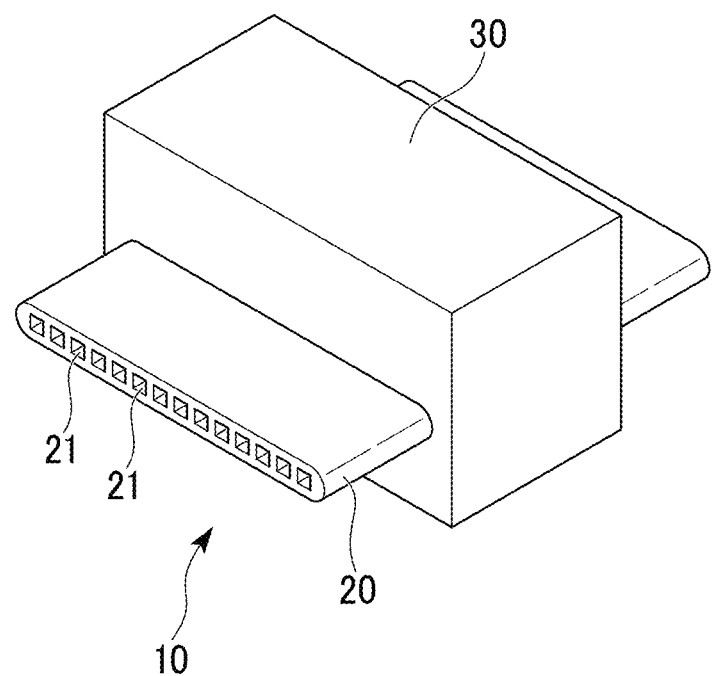
FIG. 1 is an external view of the porous aluminum complex of the first embodiment related to the present invention.

More specifically, the porous aluminum complex 10 of the present embodiment is used as heat-transfer member such as a heat exchanger and the like as shown in FIG. 1, for example. The porous aluminum complex 10 includes an aluminum multi-port tube 20 (aluminum bulk body) with the flow passage in which heat medium liquid flows; and the porous aluminum sintered body 30 (porous aluminum body) which is joined to at least a part of the outer peripheral surface of the aluminum multi-port tube 20.

The aluminum multi-port tube 20 is made of aluminum or aluminum alloy. In the present embodiment, it is made of Al—Mn alloy such as A3003 and the like. For example, the aluminum multi-port tube 20 is formed by extruding; is in a flat shape; and has multiple through holes 21 that are flow passages in which heat medium flows, as shown in FIG. 1.

The porous aluminum sintered body 30 is what the aluminum substrates 31 are integrally combined by sintering; and the porosity of the porous aluminum sintered body 30 is set to the range of 30% or more and 90% or less.

Figure 2:
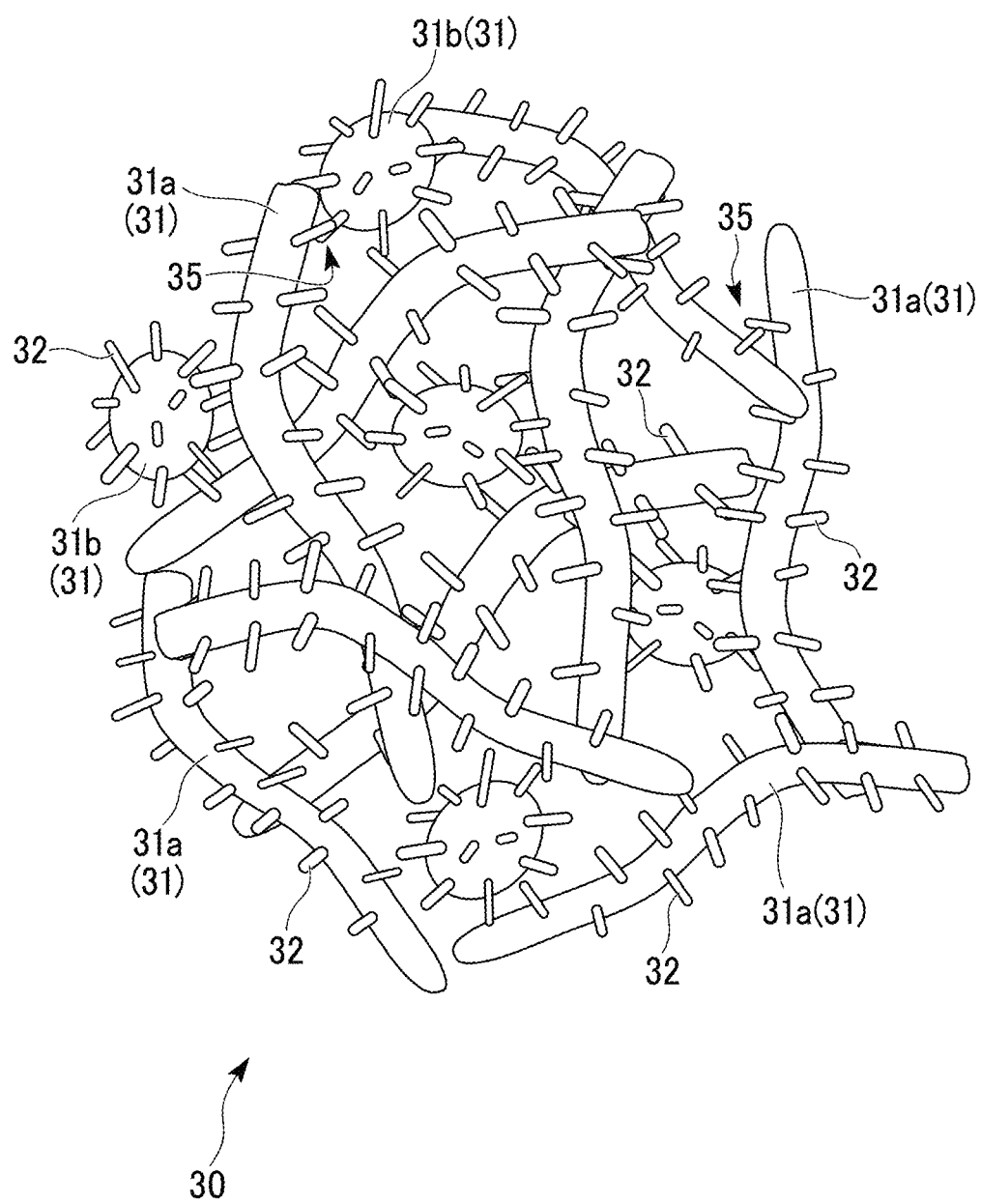
FIG. 2 is a partially enlarged schematic view of the porous aluminum body in the porous aluminum complex shown in FIG. 1.

In the porous aluminum sintered body of the present embodiment, the aluminum fibers 31a and the aluminum powder 31b are used as the aluminum substrates 31 as shown in FIG. 2.

The porous aluminum sintered body 30 has the structure, in which the pillar-shaped protrusions 32 projecting toward the outside are formed on the outer surfaces of the aluminum substrates 31 (the aluminum fibers 31a and the aluminum powder 31b); and the aluminum substrates 31 (the aluminum fibers 31a and the aluminum powder 31b) are bonded to each other through the pillar-shaped protrusions 32. As shown in FIG. 2, the substrate junctions 35 between the aluminum substrates 31, 31 include: a part in which the pillar-shaped protrusions 32, 32 are bonded to each other; a part in which the pillar-shaped protrusion 32 and the side surface of the aluminum substrate 31 are bonded to each other; and a part in which the side surfaces of the aluminum substrates 31, 31 are bonded to each other.

Figure 3:
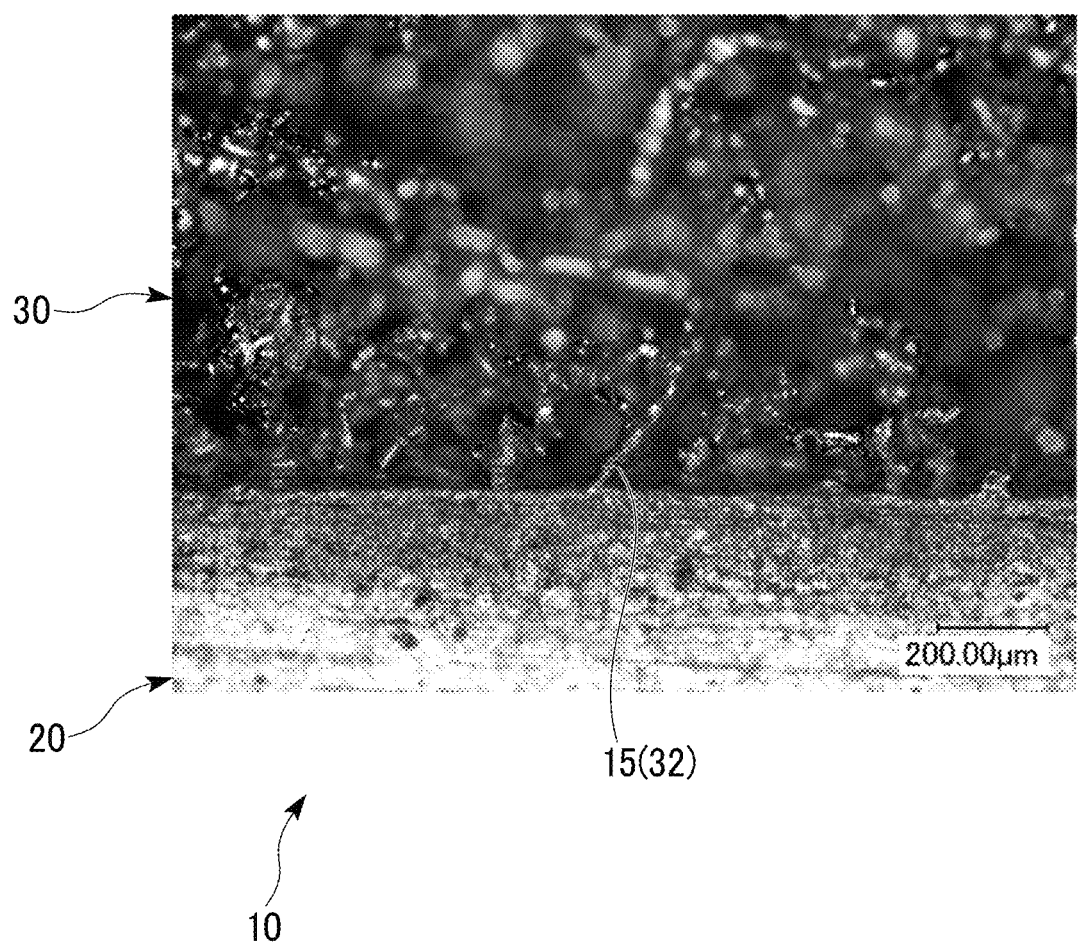
FIG. 3 is an observation photograph of the junction between the porous aluminum body and the aluminum plate in the porous aluminum complex shown in FIG. 1.

In the porous aluminum complex 10 of the present embodiment, pillar-shaped protrusions 32 projecting toward the outside are formed on the outer surfaces of one of or both of the aluminum multi-port tube 20 and the porous aluminum sintered body 30; and the aluminum multi-port tube 20 and the porous aluminum sintered body 30 are joined through these pillar-shaped protrusions 32 as shown in FIG. 3.

In other words, the junctions 15 of the aluminum multi-port tube 20 and the porous aluminum sintered body 30 are formed on the pillar-shaped protrusions 32.

Figure 4:
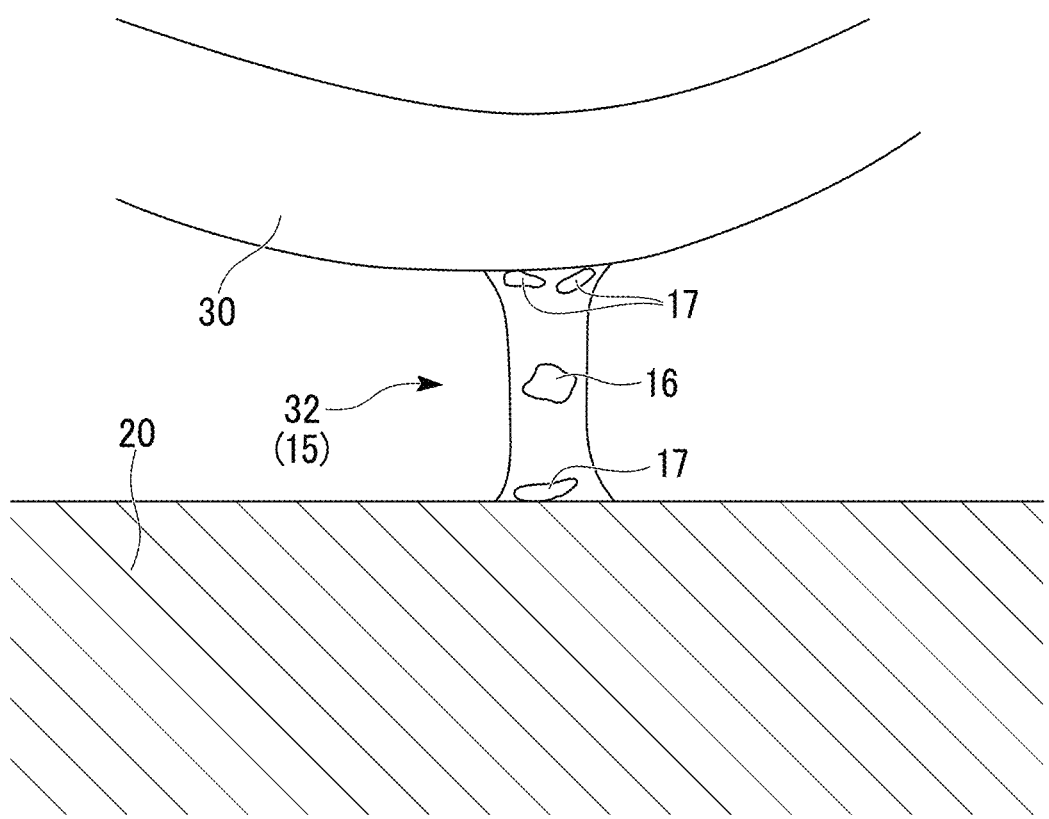
FIG. 4 is an explanatory diagram of the junction between the porous aluminum body and the aluminum bulk body shown in FIG. 1.

The junctions 15 in which the aluminum multi-port tube 20 and the porous aluminum sintered body 30 are joined through the pillar-shaped protrusions 32, includes the Ti—Al compound 16 and the eutectic element compound 17 including a eutectic element capable of eutectic reaction with Al as shown FIG. 4. The Ti—Al compound 16 is a compound of Ti and Al in the present embodiment as shown in FIG. 4. More specifically, it is $Al_3Ti$ intermetallic compound. In other words, the aluminum multi-port tube 20 and the porous aluminum sintered body 30 are bonded to each other in the part where the Ti—Al compound 16 exists in the present embodiment.

As the eutectic element capable of eutectic reaction with Al, Ag, Au, Ba, Be, Bi, Ca, Cd, Ce, Co, Cu, Fe, Ga, Gd, Ge, In, La, Li, Mg, Mn, Nd, Ni, Pd, Pt, Ru, Sb, Si, Sm, Sn, Sr, Te, Y, Zn, and the like are named, for example.

In the present embodiment, the eutectic element compound 17 includes Ni, Mg, Cu and Si as the eutectic element as shown in FIG. 4.

In addition, in the porous aluminum sintered body 30, the substrate junction 35, in which the aluminum substrates 31, 31 are bonded to each other through the pillar-shaped protrusions 32, includes the Ti—Al compound 16 and the eutectic element compound 17 including a eutectic element capable of eutectic reaction with Al. In the present embodiment, the Ti—Al compound is a compound of Ti and Al. More specifically, it is $Al_3Ti$ intermetallic compound. In addition, the eutectic element compound includes Ni, Mg, Cu and Si as the eutectic element. In other words, the aluminum substrates 31, 31 are bonded to each other in the part where the Ti—Al compound exists in the present embodiment.

Figure 5:
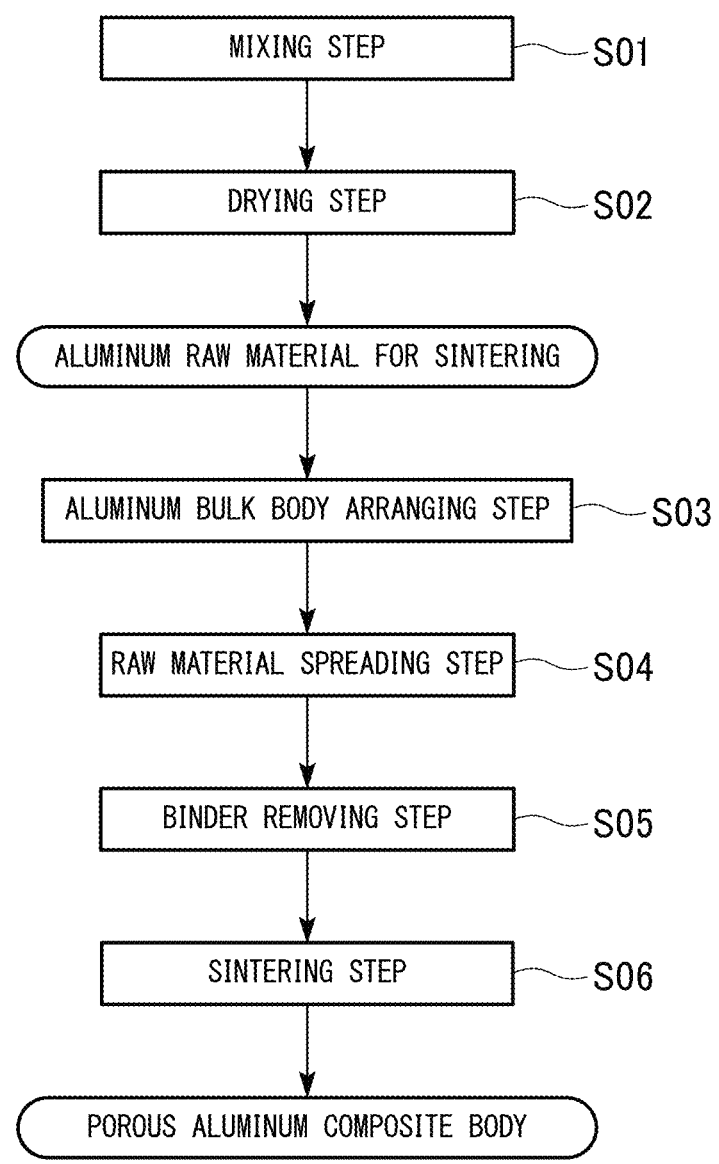
FIG. 5 is a flow diagram showing an example of the method of producing the porous aluminum complex shown in FIG. 1.
Figure 6:
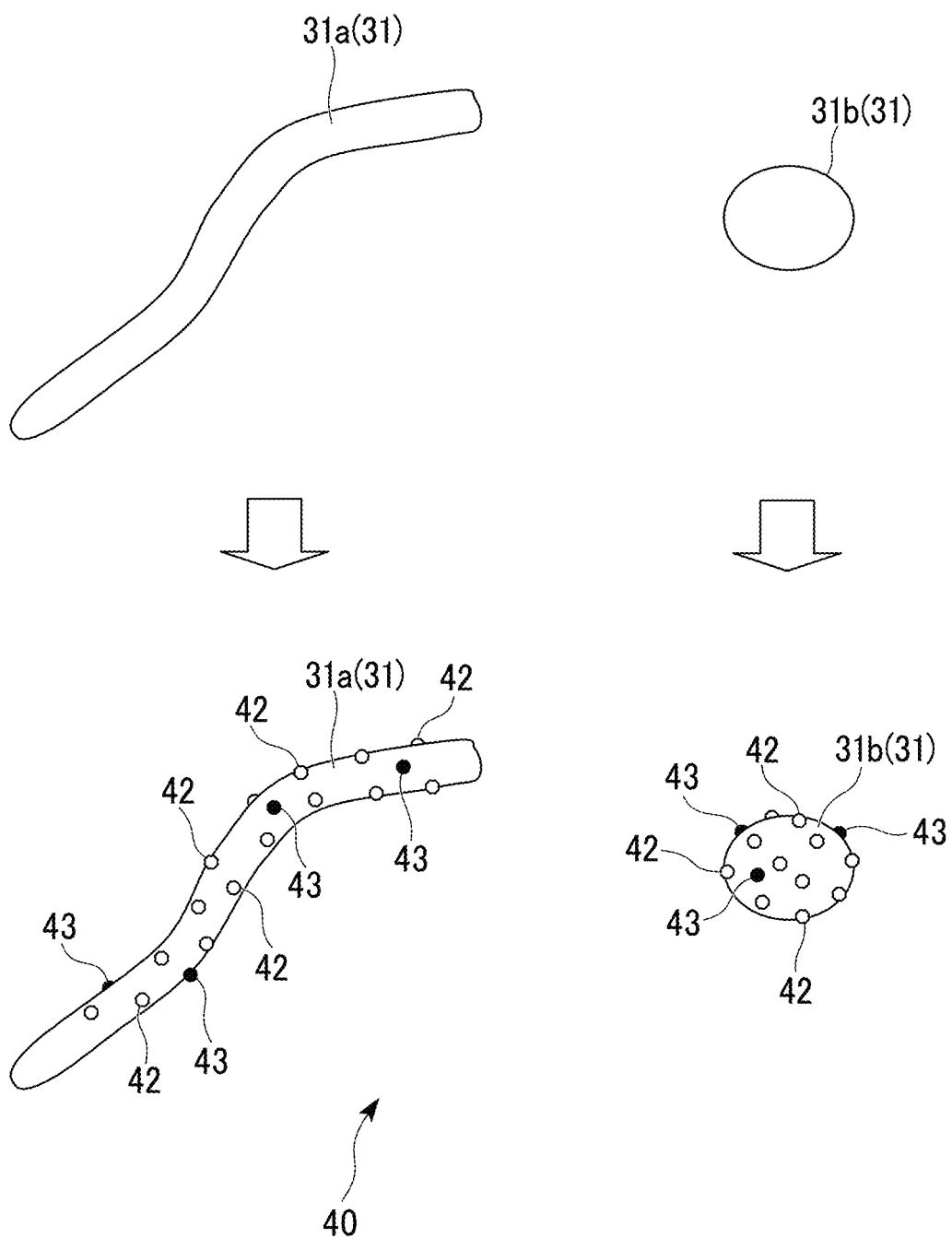
FIG. 6 is an explanatory diagram of the aluminum raw material for sintering in which the titanium powder and the eutectic element powder are adhered on the surfaces of the aluminum substrates.
Figure 7:
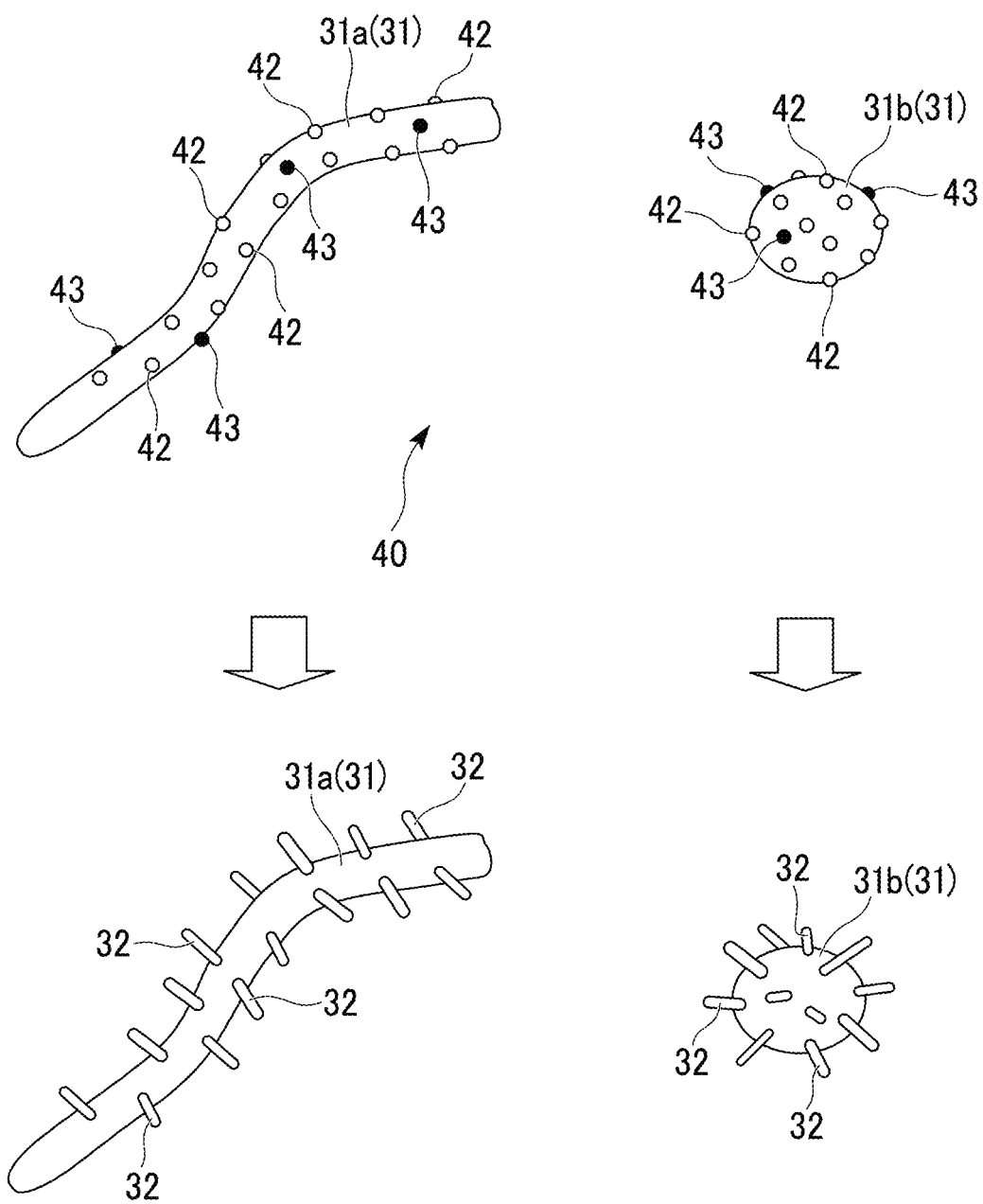
FIG. 7 is an explanatory diagram showing the state where the pillar-shaped protrusions are formed on the outer surfaces of the aluminum substrates in the step of sintering.

Next, the method of producing the porous aluminum complex 10, which is the present embodiment, is explained in the reference to FIGS. 5 to 7.

First, the aluminum raw material for sintering 40, which is the raw material of the porous aluminum the porous aluminum complex of the present embodiment, is explained. The aluminum raw material for sintering 40 includes: the aluminum substrate 31; and the titanium powder grains 42 and the eutectic element powder grains 43 (the nickel powder grains, the magnesium powder grains, the copper powder grains, or the silicon powder grains), both of which are adhered on the outer surface of the aluminum substrate 31, as shown in FIG. 6. As the titanium powder grains 42, any one or both of the metal titanium powder grains and the titanium hydride powder grains can be used. As the eutectic element powder grains 43 (the nickel powder grains, the magnesium powder grains, the copper powder grains, or the silicon powder grains), the metal nickel powder grains; the metal magnesium powder grains; the metal copper powder grains; the metal silicon powder grains; and grains made of alloys thereof can be used.

In the aluminum raw material for sintering 40, the content amount of the titanium powder grains 42 is set to the range of 0.01 mass % or more and 20 mass % or less.

The grain size of the titanium powder grains 42 is set to the range of 1 μm or more and 50 μm or less. Preferably, it is set to 5 μm or more and 30 μm or less. The titanium hydride powder grains can be set to a value finer than that of the metal titanium powder grains. Thus, in the case where the grain size of the titanium powder grains 42 adhered on the outer surface of the aluminum substrate 31 is set to a fine value, it is preferable that the titanium hydride powder grains are used.

Moreover, it is preferable that the distance between the titanium powder grains 42, 42 adhered on the outer surface of the aluminum substrate 31 is set to the range of 5 μm or more and 100 μm or less.

In addition, in the aluminum raw material for sintering 40, the content amount of the eutectic element powder grains 43 is set such that the content amount of the nickel powder grain is set to the range of 0.01 mass % or more and 5.0 mass % or less; the content amount of the magnesium powder grain is set to the range of 0.01 mass % or more and 5.0 mass % or less; the content amount of the copper powder grain is set to the range of 0.01 mass % or more and 5.0 mass % or less; and the content amount of the silicon powder grain is set to the range of 0.01 mass % or more and 15.0 mass % or less The grain size of the eutectic element powder grains 43 is set: to the range of 1 μm or more and 20 μm or less, preferably, 2 μm or more and 10 μm or less in the nickel powder grains; to the range of 20 μm or more and 500 μm or less, preferably, 20 μm or more and 100 μm or less in the magnesium powder grains; to the range of 5 μm or more and 500 μm or less, preferably, 20 μm or more and 100 μm or less in the copper powder grains; and to the range of 5 μm or more and 200 μm or less, preferably, 10 μm or more and 100 μm or less in the silicon powder grains.

As the aluminum substrate 31, the aluminum fibers 31a and the aluminum powder 31b are used as described above. As the aluminum powder 31b, an atomized powder can be used.

The fiber diameter of the aluminum fiber 31a is set to the range of 20 μm or more and 1000 μm or less. Preferably, it is set to the range of 50 μm or more and 500 μm or less. The fiber length of the aluminum fiber 31a is set to the range of 0.2 mm or more and 100 mm or less. Preferably, it is set to the range of 1 mm or more and 50 mm or less.

The aluminum fiber 31a is made of pure aluminum or an aluminum alloy, for example; and the ratio L/R of the length L to the fiber diameter R may be set to the range of 4 or more and 2500 or less. The aluminum fiber 31a can be obtained by the step of forming the aluminum raw material for sintering, in which any one or both of the silicon powder and the silicon alloy powder are adhered on its outer surface and the aluminum raw material for sintering is formed. In the step of sintering, the aluminum raw material for sintering can be sintered at the temperature range of 575° C. to 655° C. under an inert gas atmosphere.

In the case where the fiber diameter R of the aluminum fiber 31a is less than 20 μm, sufficient sintered strength might not be obtained due to too small junction area of the aluminum fibers. On the other hand, in the case where the fiber diameter R of the aluminum fiber 31a is more than 1000 μm, sufficient sintered strength might not be obtained due to lack of contact points of the aluminum fibers.

Because of the reasons described above, in the porous aluminum sintered body 30 of the present embodiment, the fiber diameter R of the aluminum fiber 31a is set to the range of 20 μm or more and 500 μm or less. In the case where more improved sintered strength is needed, it is preferable that the fiber diameter of the aluminum fiber 31a is set to 50 μm or more; and the fiber diameter of the aluminum fiber 31a is set to 500 μm or less.

In the case where the ratio L/R of the length L of the aluminum fiber 31a to the fiber diameter R is less than 4, it becomes harder to keep the bulk density DP in a stacking arrangement at 50% of the true density DT of the aluminum fiber or less in the method of producing the porous aluminum sintered compact. Thus, obtaining the porous aluminum sintered body 30 having high porosity could be difficult. On the other hand, in the case where the ratio L/R of the length L of the aluminum fiber 31a to the fiber diameter R is more than 2500, it becomes impossible to disperse the aluminum fibers 31a evenly. Thus, obtaining the porous aluminum sintered body 30 having uniform porosity could be difficult.

Because of the reasons described above, in the porous aluminum sintered body 30 of the present embodiment, the ratio L/R of the length L of the aluminum fiber 31a to the fiber diameter R is set to the range of 4 or more and 2500 or less. In the case where more improved porosity is needed, it is preferable that the ratio L/R of the length L to the fiber diameter R is set to 10 or more. In addition, in order to obtain the porous aluminum sintered body 30 having more uniform porosity, it is preferable that the ratio L/R of the length L to the fiber diameter R is set to 500 or more.

The grain size of the aluminum powder 31b is set to the range of 5 μm or more and 500 μm or less. Preferably, it is set to the range of 20 μm or more and 200 μm or less.

In addition, the porosity can be controlled by adjusting the mixing rate of the aluminum fibers 31a and the aluminum powder 31b. More specifically, the porosity of the porous aluminum sintered compact can be improved by increasing the ratio of the aluminum fiber 31a. Because of this, it is preferable that the aluminum fibers 31a are used as the aluminum substrates 31. In the case where the aluminum powder 31b is mixed in, it is preferable that the ratio of the aluminum powder 31b is set to 15 mass % or less.

In addition, as the aluminum substrates 31 (the aluminum fibers 31a and the aluminum powder 31b), the aluminum substrates made of the standard aluminum alloy may be used.

For example, the aluminum substrates made of the A3003 alloy (Al—0.6 mass % Si—0.7 mass % Fe—0.1 mass % Cu—1.5 mass % Mn—0.1 mass % Zn alloy), the A5052 alloy (Al—0.25 mass % Si—0.40 mass % Fe—0.10 mass % Cu—0.10 mass % Mn—2.5 mass % Mg—0.2 mass % Cr—0.1 mass % Zn alloy) as defined in JIS, and the like can be suitably used.

In addition, the composition of the aluminum substrates 31 is not limited to a specific single kind composition. It can be appropriately adjusted depending on the purpose, for example, like using the mixture of fibers made of the pure aluminum and the powder made of JIS A3003 alloy.

In the method of producing the porous aluminum complex 10 of the present embodiment, the above-described aluminum raw material for sintering 40 is prepared as shown in FIG. 5.

The above-described aluminum substrates 31, the titanium powder, and the eutectic element powder (for example, the nickel powder grains, the magnesium powder grains, the copper powder grains, the silicon powder grains) are mixed at room temperature (the mixing step S01). At this time, the binder solution is sprayed on. As the binder, what is burned and decomposed during heating at 500° C. in the air is preferable. More specifically, using an acrylic resin or a cellulose-based polymer material is preferable. In addition, various solvents such as the water-based, alcohol-based, and organic-based solvents can be used as the solvent of the binder.

In the mixing step S01, the aluminum substrates 31, the titanium powder, and the eutectic element powder (the nickel powder grains, the magnesium powder grains, copper powder grains, and silicon powder grains, for example) are mixed by various mixing machine, such as an automatic mortar, a pan type rolling granulator, a shaker mixer, a pot mill, a high-speed mixer, a V-shaped mixer, and the like, while they are fluidized.

Next, the mixture obtained in the mixing step S01 is dried (the drying step S02). By the mixing step S01 and the drying step S02, the titanium powder grains 42 and the eutectic element powder grain 43 (for example, the nickel powder grains, the magnesium powder grains, the copper powder grains, the silicon powder grains) are dispersedly adhered on the surfaces of the aluminum substrates 31 as shown in FIG. 6; and the aluminum raw material for sintering 40 in the present embodiment is produced.

Next, a cuboid carbon container is set and the aluminum multi-port tube 20, which is the aluminum bulk body, is arranged in such way that the aluminum multi-port tube 20 penetrates through the carbon container from one side surface to other side surface (the aluminum bulk body arranging step S03).

Then, the aluminum raw material for sintering 40 is spread to the inside of the carbon container to bulk fill (the raw material spreading step S04).

Then, it is inserted in the degreasing furnace, and the binder is removed by heating in the air atmosphere (the binder removing step S05).

After that, it is inserted in the sintering furnace, and maintained at 575° C. to 665° C. for 0.5 to 60 minutes in an inert gas atmosphere depending on the kinds and amount of the added eutectic element grains (the sintering step S06). It is preferable that the retention time is 1 minute to 20 minutes.

In the sintering step S06, the aluminum substrates 31 in the aluminum raw material for sintering 40 are melted. Since the oxide films are formed on the surfaces of the aluminum substrates 31, the melted aluminum is held by the oxide film; and the shapes of the aluminum substrates 31 are maintained.

In the part where the titanium powder grains 42 are adhered among the outer surfaces of the aluminum substrates 31, the oxide files are destroyed by the reaction with titanium; and the melted aluminum inside spouts out. The spouted out melted aluminum forms a high-melting point compound by reacting with titanium to be solidified. Because of this, the pillar-shaped protrusions 32 projecting toward the outside are formed on the outer surfaces of the aluminum substrates 31 as shown in FIG. 7. On the tip of the pillar-shaped protrusion 32, the Ti—Al compound 16 exists. Growth of the pillar-shaped protrusion 32 is suppressed by the Ti—Al compound 16.

In the case where titanium hydride is used as the titanium powder grains 42, titanium hydride is decomposed near the temperature of 300° C. to 400° C.; and the produced titanium reacts with the oxide films on the surfaces of the aluminum substrates 31.

In addition, in the present embodiment, locations having a lowered melting point are formed locally to the aluminum substrates 31 by the eutectic element powder 23 (for example, the nickel powder grains, the magnesium powder grains, the copper powder grains, the silicon powder grains) adhered on the outer surfaces of the aluminum substrates 31. Therefore, the pillar-shaped protrusions 32 are formed reliably even in the relatively low temperature condition such as 575° C. to 655° C. depending on the kind and the additive amount of the added eutectic element grains.

At this time, the adjacent the aluminum substrates 31, 31 are bonded to each other by being combined integrally in a molten state or being sintered in a solid state through the pillar-shaped protrusions 32 of each. Accordingly, the porous aluminum sintered body 30, in which the aluminum substrates 31, 31 are bonded to each other through the pillar-shaped protrusions 32 as shown in FIG. 2, is produced. In addition, the substrate junction 35, in which the aluminum substrates 31, 31 are bonded to each other through the pillar-shaped protrusion 32, includes the Ti—Al compound ($Al_3Ti$ intermetallic compound in the present embodiment) and the eutectic element compound.

Then, the aluminum multi-port tube 20 and the porous aluminum sintered body 30 are joined through the pillar-shaped protrusions 32 by the pillar-shaped protrusions 32 of the aluminum substrates 31 constituting the porous aluminum sintered body 30 being bonded to the aluminum multi-port tube 20 as shown in FIGS. 3 and 4. In the case where the titanium powder grains 42 and the eutectic element powder grains 43 (the nickel powder grains, the magnesium powder grains, the copper powder grains, and the silicon powder grains, for example) are placed to contact to the surfaces of the aluminum multi-port tube 20, the pillar-shaped protrusions 32 are formed even from the surface of the aluminum multi-port tube 20. Accordingly, the aluminum multi-port tube 20 and the porous aluminum sintered body 30 are joined.

The junction 15, in which the aluminum multi-port tube 20 and the porous aluminum sintered body 30 are bonded through the pillar-shaped protrusions 32, includes the Ti—Al compound 16 ($Al_3Ti$ intermetallic compound in the present embodiment) and the eutectic element compound 17.

In the porous aluminum complex 10 of the present embodiment configured as described above, the junction 15 between the aluminum multi-port tube 20 and the porous aluminum sintered body 30 includes the Ti—Al compound 16. Thus, the oxide films formed on the surfaces of the aluminum multi-port tube 20 and the porous aluminum sintered body 30 are removed by the Ti—Al compound 16; and the joint strength between the aluminum multi-port tube 20 and the porous aluminum sintered body 30 is improved significantly.

In addition, since the growth of the pillar-shaped protrusions 32 is suppressed by the Ti—Al compound 16, spouting out of the melted aluminum to the side of the porous aluminum sintered body 30 can be suppressed; and the porosity of sufficient porous aluminum sintered body 30 can be obtained.

Especially, $Al_3Ti$ exists as the Ti—Al compound 16 in the junction 15 between the aluminum multi-port tube 20 and the porous aluminum sintered body 30 in the present embodiment. Thus, the oxide films formed on the surfaces of the aluminum multi-port tube 20 and the porous aluminum sintered body 30 are removed reliably; and sufficient joint strength between the aluminum multi-port tube 20 and the porous aluminum sintered body 30 can be obtained.

In addition, in the present embodiment, the junction 15 includes the eutectic element compound 17. Thus, there are locations having a lowered melting point locally in the aluminum substrates 31; the thick pillar-shaped protrusions 32 are likely to be formed; and the joint strength between the aluminum multi-port tube 20 and the porous aluminum sintered body 30 can be further improved.

In addition, the content amount of the titanium powder grains 42 in the aluminum raw material for sintering 40 is set to 0.01 mass % or more and 20 mass % or less in the present embodiment. Thus, the pillar-shaped protrusions 32 can be formed with an appropriate distance therebetween on the outer surfaces of the aluminum substrates 31. Accordingly, the aluminum multi-port tube 20 and the porous aluminum sintered body 30 can be joined reliably.

In addition, the distance between the titanium powder grains 42, 42 each other adhered on the outer surfaces of the aluminum substrates 31 is set to the range of 5 μm or more and 100 μm or less in the present embodiment. Thus, the distance between the pillar-shaped protrusions 32 is set appropriately. Accordingly, the porous aluminum sintered body 30 having sufficient strength and high porosity can be obtained.

In addition, the content amount of the eutectic element powder grains 43 (the nickel powder grains, the magnesium powder grains, the copper powder grains, and the silicon powder grains) in the aluminum raw material for sintering 40 is set in such a way that: the content amount of the nickel powder grains is set in the range of 0.01 mass % or more and 5.0 mass % or less; the content amount of the magnesium powder grains is set in the range of 0.01 mass % or more and 5.0 mass % or less; the content amount of the copper powder grains is set in the range of 0.01 mass % or more and 5.0 mass % or less; and the content amount of the silicon powder grains is set in the range of 0.01 mass % or more and 15.0 mass % or less. Thus, locations with a lower melting point can be formed locally in the aluminum substrates 31 with an appropriate distance therebetween; and excessive overflow of the melted aluminum can be suppressed. Accordingly, the porous aluminum sintered body 30 having sufficient strength and high porosity can be obtained.

In addition, the pillar-shaped protrusions 32 are formed reliably even in the relatively low temperature condition, such as 575° C. to 665° C., depending on the kind and the additive amount of the added eutectic element grains; and the temperature condition of the step of sintering can be set at a lower temperature.

In addition, the aluminum fibers 31a and the aluminum powder 31b are used as the aluminum substrates 31 in the present embodiment. Thus, the porosity of the porous aluminum sintered body 30 can be controlled by adjusting the mixing rates.

In addition, the porosity is set to the range of 30% or more and 90% or less in the porous aluminum sintered body 30 of the present embodiment. Thus, it is possible to obtain sufficient surface area in the porous aluminum complex 10, which is used as a heat-transfer member; and heat-transfer efficiency can be improved significantly.

Second Embodiment

Next, the porous aluminum complex 110, which is the second embodiment of the present invention, is explained in reference to the attached drawings.

Figure 8:
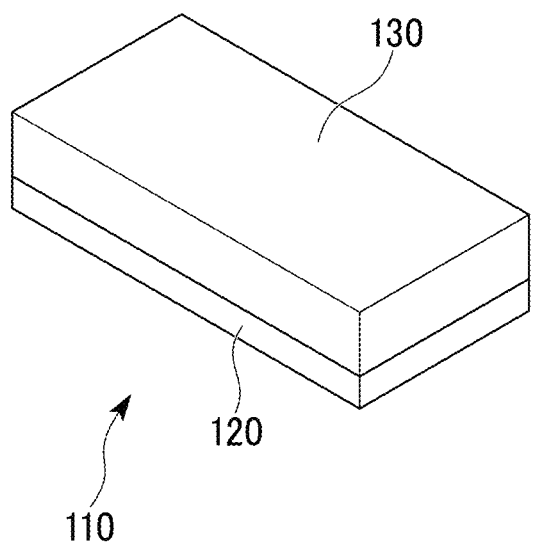
FIG. 8 is an external view of the porous aluminum complex of the second embodiment related to the present invention.

The porous aluminum complex 110 of the present embodiment is shown in FIG. 8. The porous aluminum complex 110 includes the aluminum plate 120 (aluminum bulk body), which is made of aluminum or aluminum alloy, and the porous aluminum body 130 joined to the surface of the aluminum plate 120.

In the porous aluminum complex 110 of the present embodiment, the pillar-shaped protrusions 132 projecting toward the outside are formed on one of or both of the aluminum plate 120 and the porous aluminum body 130; and the aluminum plate 120 and the porous aluminum body 130 are joined through these pillar-shaped protrusions 132. In other words, the junction 115 between the aluminum plate 120 and the porous aluminum body 130 is formed in the pillar-shaped protrusions 132.

Figure 9:
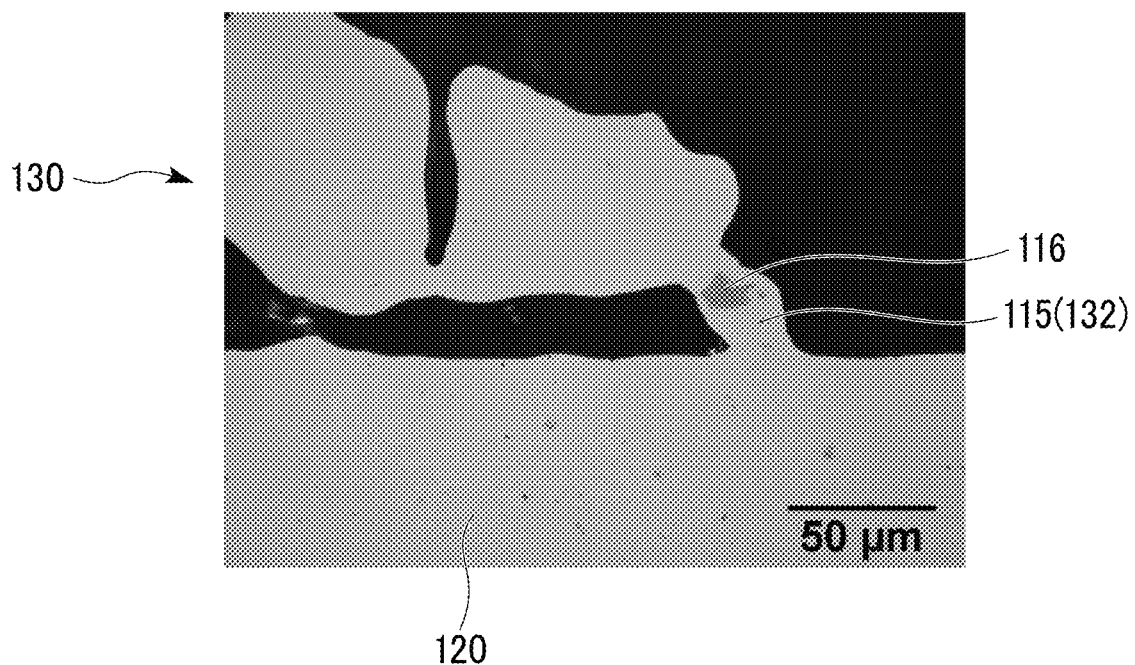
FIG. 9 is an observation photograph the junction between the porous aluminum body and the aluminum bulk body in the porous aluminum complex shown in FIG. 8.

As shown in FIG. 9, the junction 115 between the aluminum plate 120 and the porous aluminum body 130 bonded through the pillar-shaped protrusions 132 includes the Ti—Al compound 116. In the present embodiment, the Ti—Al compound 116 is a compound of Ti and Al. More specifically, the Ti—Al compound 116 is $Al_3Ti$ intermetallic compound. In other words, in the present embodiment, the aluminum plate 120 and the porous aluminum body 130 are bonded in the location including the Ti—Al compound 116.

Figure 10:
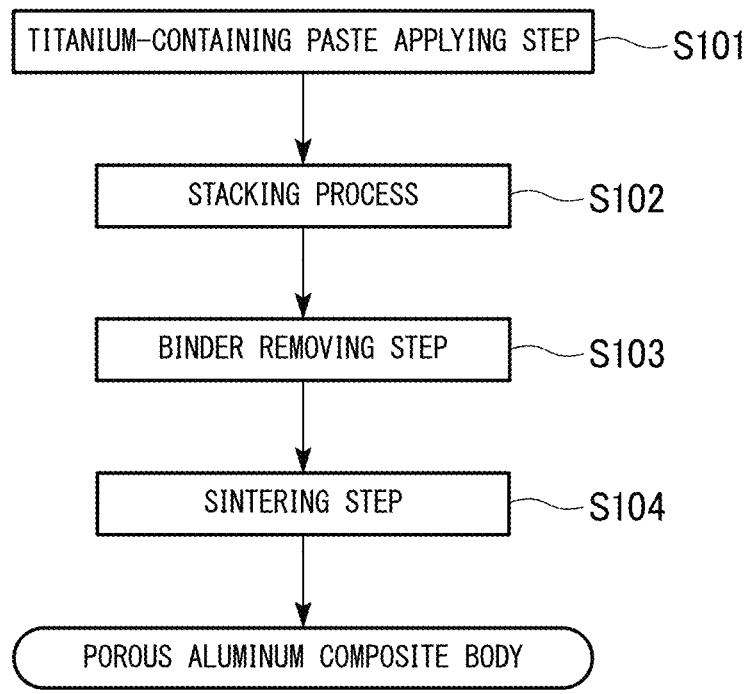
FIG. 10 is a flow diagram showing an example of the method of producing the porous aluminum complex shown in FIG. 8.

Next, the method of producing the porous aluminum complex 110 of the present embodiment is explained in reference to the flow chart and the like shown in FIG. 10.

First, the titanium-containing paste that contains the titanium powder is applied on the joint surface of the aluminum plate 120 (the titanium-containing paste applying step S101). At this step, the application amount of the titanium-containing paste is set to the range of 0.0005 g/cm$^2$ or more to 0.05 g/cm$^2$ or less based on the titanium amount The titanium-containing paste includes: the titanium powder with the grain size of 1 μm or more and 50 μm or less in the range of 60 mass % or more and 80 mass % or less; and the binder (acrylic IPA solution, for example) or the like, for example. As the titanium powder, the titanium hydride powder and the metal titanium power can be used. In addition, the titanium-containing paste may include the eutectic element powder.

Next, the porous aluminum body 130 is stacked on the surface, on which the titanium-containing paste is applied, of the aluminum plate 120 (the stacking process S102).

Then, after inserting the stacked aluminum plate 120 and the porous aluminum body 130 in the degreasing furnace, they are heated in the air atmosphere to remove the binder (the binder removing step S103).

Then, they are inserted in the sintering furnace, and maintained at 575° C. to 665° C. for 0.5 to 60 minutes in an inert gas atmosphere depending on the kinds and amount of the added eutectic element grains (the sintering step S104). It is preferable that the retention time is 1 minute to 20 minutes.

In the sintering step S104, a part of the surface of the aluminum plate 120 is melted. Since the oxide films are formed on the surfaces of the aluminum plate 120, the melted aluminum is held by the oxide film; and the shape of the aluminum plate 120 is maintained.

In the part where the titanium powder grains 42 are adhered among the surfaces of the aluminum plate 120, the oxide files are destroyed by the reaction with titanium; and the melted aluminum inside spouts out. The spouted out melted aluminum forms a high-melting point compound by reacting with titanium to be solidified. Because of this, the pillar-shaped protrusions 132 projecting toward the outside are formed on the surfaces of the aluminum plate 120. On the tip of the pillar-shaped protrusion 132, the Ti—Al compound 116 exists. Growth of the pillar-shaped protrusion 132 is suppressed by the Ti—Al compound 116.

Then, the aluminum plate 120 and the porous aluminum body 130 are joined through the pillar-shaped protrusions 132 by the pillar-shaped protrusions 132 of the aluminum plate 120 being bonded to the porous aluminum body 130. In the case where the titanium powder grains are placed to contact to the surfaces of the porous aluminum body 130, the pillar-shaped protrusions 132 are formed even from the surface of the porous aluminum body 130. Accordingly, the aluminum plate 120 and the porous aluminum body 130 are joined.

In the porous aluminum complex 110 of the present embodiment configured as described above, the junction 115 between the aluminum plate 120 and the porous aluminum body 130 includes the Ti—Al compound 116. Thus, the joint strength between the aluminum plate 120 and the porous aluminum body 130 is improved significantly.

In addition, since the growth of the pillar-shaped protrusions 132 is suppressed by the Ti—Al compound 116, spouting out of the melted aluminum to the side of the porous aluminum body 130 can be suppressed; and the porosity of sufficient porous aluminum body 130 can be obtained.

In addition, in the present embodiment, the aluminum plate 120 and the porous aluminum body 130 are joined by: applying the titanium-containing paste that contains the titanium powder; and sintering. Thus, the porous aluminum complex 110 including the aluminum plate 120 and the porous aluminum body 130 can be produced relatively easily.

Another method of producing the porous aluminum sintered compact is described below.

For example, the aluminum fibers 31a; and the eutectic element powder 43, such as any one or both of the silicon powder and the silicon alloy powder, are mixed at room temperature. During mixing, a binder solution is sprayed on. As the binder, what is burned and decomposed during heating at 500° C. in the air is preferable. More specifically, using an acrylic resin or a cellulose-based polymer material is preferable. In addition, various solvents such as the water-based, alcohol-based, and organic-based solvents can be used as the solvent of the binder.

During mixing, the aluminum fibers 31a and the silicon powder 43 are mixed by various mixing machine, such as an automatic mortar, a pan type rolling granulator, a shaker mixer, a pot mill, a high-speed mixer, a V-shaped mixer, and the like, while they are fluidized.

Next, by drying the mixture obtained by mixing, the silicon powder and the silicon alloy powder are dispersedly adhered on the outer surfaces of the aluminum fibers; and the aluminum raw material for sintering in the present embodiment is produced.

Next, during producing the porous aluminum sintered compact by using the aluminum raw material for sintering obtained as described above, the porous aluminum sintered compact in the long sheet shape of 300 mm of width; 1-5 mm of thickness; and 20 m of length, is produced, for example, by using a continuous sintering apparatus or the like for example.

For example, the aluminum raw material for sintering is spread toward the upper surface of the carbon sheet from a raw material spreading apparatus; the aluminum raw material for sintering is stacked; and the aluminum raw material for sintering stacked on the carbon sheet is shaped into a sheet-shape. At this time, voids are formed between the aluminum fibers in the aluminum raw material for sintering without placing load.

At this time, for example, the aluminum fibers are stacked in such a way that the bulk density after filling becomes 50% of the true density of the aluminum fibers to maintain three-dimensional and isotropic voids between the aluminum fibers in stacking.

Next, the aluminum raw material for sintering, which is shaped into the sheet-shape on the carbon sheet, is inserted in the degreasing furnace; and the binder is removed by being heated at a predetermined temperature. At this time, the aluminum raw material for sintering is maintained at 350° C. to 500° C. for 0.5 to 5 minutes in the air atmosphere; and the binder in the aluminum raw material for sintering is removed. In the present embodiment, the binder is used only for adhering the silicon powder and the silicon alloy powder on the outer surfaces of the aluminum fibers. Thus, the content amount of the binder is extremely low compared to the viscous compositions; and the binder can be removed sufficiently in a short time.

Next, the aluminum raw material for sintering free of the binder is inserted in the sintering furnace with the carbon sheet and sintered by being heated at a predetermined temperature.

The sintering is performed by maintaining the aluminum raw material for sintering at 575° C. to 665° C. for 0.5 to 60 minutes in an inert gas atmosphere, for example. Depending on the content amount of silicon in the aluminum raw material for sintering, the optimum sintering temperature differs. However, in order to permit high-strength and uniform sintering, the sintering temperature is set to 575° C., which is the eutectic temperature of Al—12.6 mass % Si, or more. In addition, it is set to 655° C. or less in order to prevent rapid progression of sintering shrinkage due to combining of melts in the formed liquid phases. Preferably, the retention time is set to 1 to 20 minutes.

In the sintering, a part of the aluminum fibers in the aluminum raw material for sintering is melted. However, since the oxide films are formed on the surfaces of the aluminum fibers, the melted aluminum is held by the oxide film; and the shapes of the aluminum fibers are maintained.

Embodiments of the present invention are explained above. However, the present invention is not particularly limited by the descriptions, and can be modified as needed within the scope of the present invention based on the technical concept of the present invention.

For example, it is explained in reference to the porous aluminum complex having the structures shown in FIGS. 1 and 8. However, the present invention is not limited by the description, and the porous aluminum complex may be porous aluminum complexes having structures shown in FIGS. 11 to 15.

Figure 11:
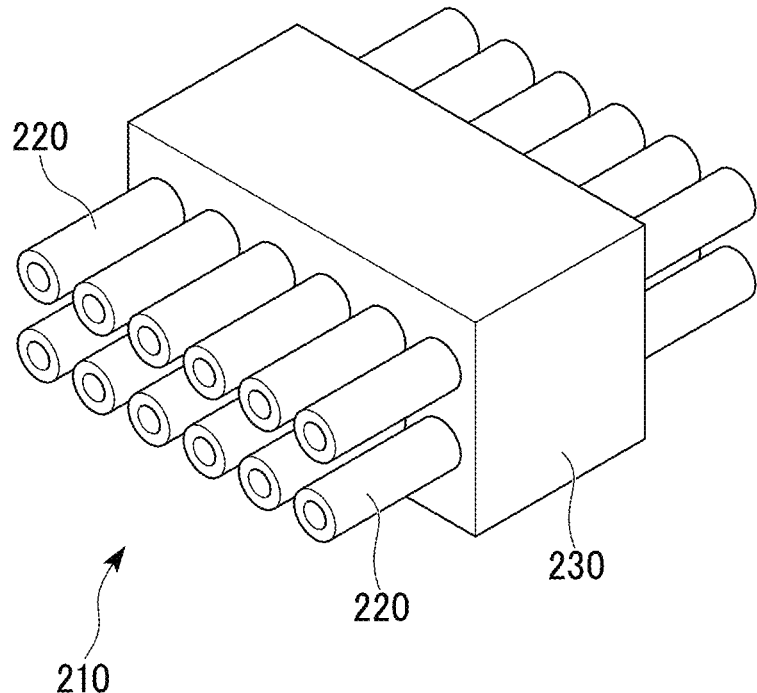
FIG. 11 is an external view of the porous aluminum complex of the other embodiment related to the present invention.

For example, as shown in FIG. 11, the porous aluminum complex may be the porous aluminum complex 210 having the structure, in which multiple aluminum tubes 220 are inserted into the porous aluminum body 230 as the aluminum bulk bodies.

Figure 12:
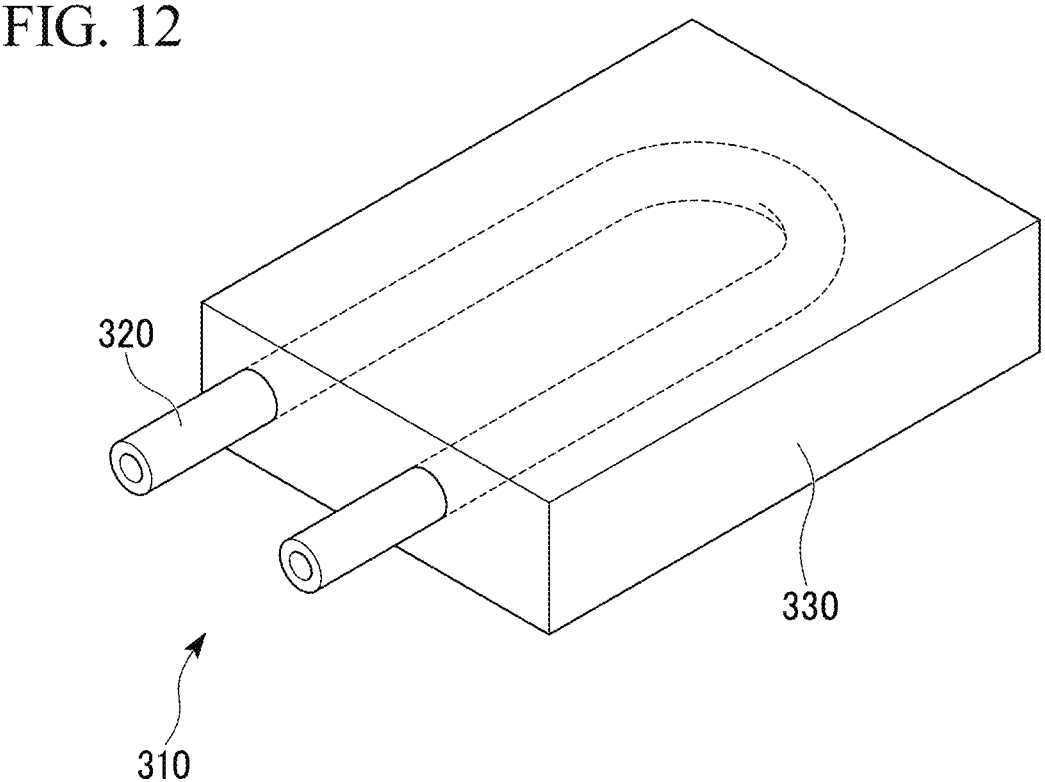
FIG. 12 is an external view of the porous aluminum complex of the other embodiment related to the present invention.

Alternatively, as shown in FIG. 12, the porous aluminum complex may the porous aluminum complex 310 having the structure in which the aluminum tube 320 curved in the U-shape is inserted into the porous aluminum body 330 as the aluminum bulk body.

Figure 13:
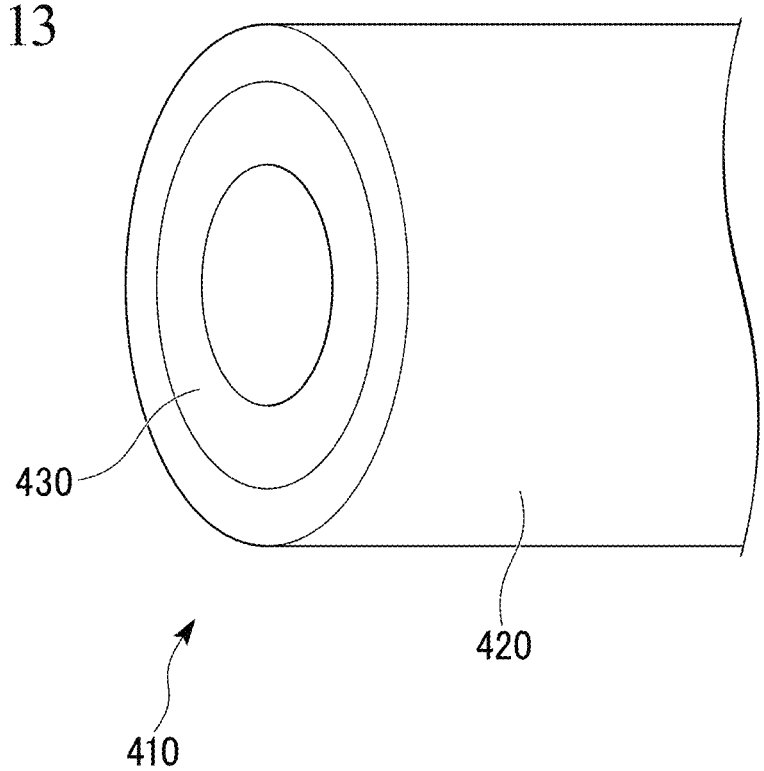
FIG. 13 is an external view of the porous aluminum complex of the other embodiment related to the present invention.

In addition, as shown in FIG. 13, the porous aluminum complex may be the porous aluminum complex 410 having the structure in which the porous aluminum body 430 is joined to the inner circumferential surface of the aluminum tube 420, which is the aluminum bulk body.

Figure 14:
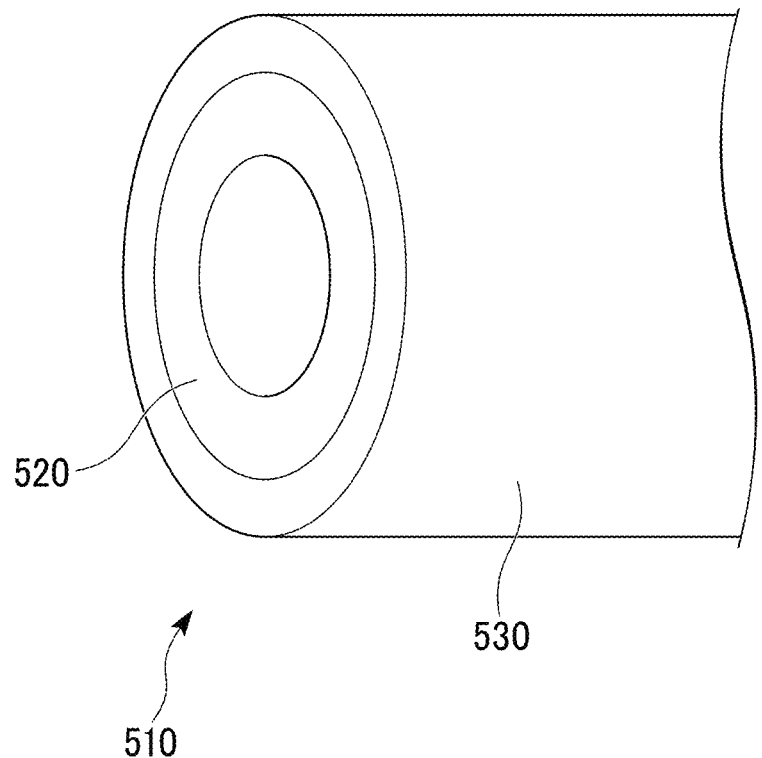
FIG. 14 is an external view of the porous aluminum complex of the other embodiment related to the present invention.

In addition, as shown in FIG. 14, the porous aluminum complex may be the porous aluminum complex 510 having the structure in which the porous aluminum body 530 is joined to the outer circumferential surface of the aluminum tube 520, which is the aluminum bulk body.

Figure 15:
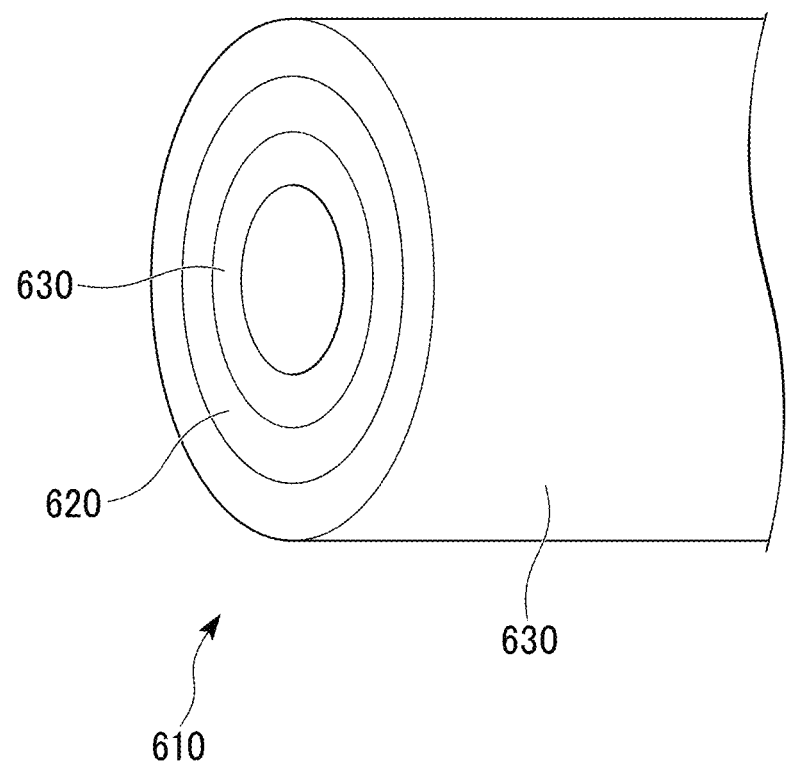
FIG. 15 is an external view of the porous aluminum complex of the other embodiment related to the present invention.

In addition, as shown in FIG. 15, the porous aluminum complex may be the porous aluminum complex 610 having the structure in which the porous aluminum bodies 630 are joined to each of the inner and outer circumferential surfaces of the aluminum tube 620, which is the aluminum bulk body.

Figure 16:
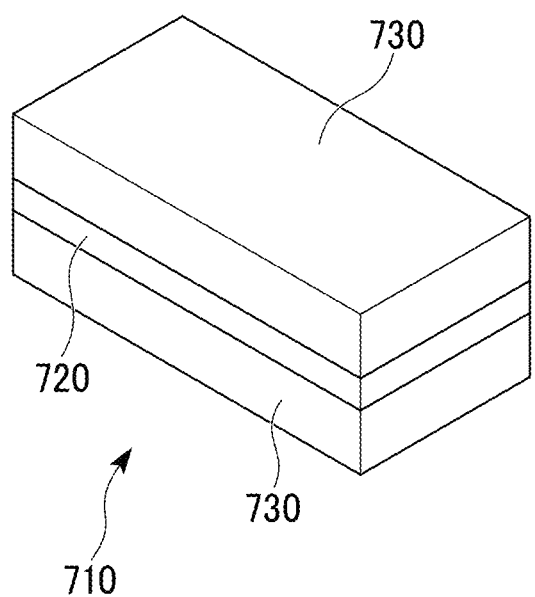
FIG. 16 is an external view of the porous aluminum complex of the other embodiment related to the present invention.

Alternatively, as shown in FIG. 16, the porous aluminum complex may be the porous aluminum complex 710 having the structure in which the porous aluminum bodies 730 are joined on both surfaces of the aluminum plate 720, which is the aluminum bulk body.

In addition, the junction between the aluminum bulk body and the porous aluminum body may include the eutectic element compound including the eutectic element capable of eutectic reaction with Al in addition to the Ti—Al compound.

As the eutectic element capable of eutectic reaction with Al, one or more selected from Ag, Au, Ba, Be, Bi, Ca, Cd, Ce, Co, Cu, Fe, Ga, Gd, Ge, In, La, Li, Mg, Mn, Nd, Ni, Pd, Pt, Ru, Sb, Si, Sm, Sn, Sr, Te, Y, and Zn may be used.

EXAMPLES

Results of confirmatory experiments performed to confirm the technical effect of the present invention are explained below.

Examples (Exs.) 1-15 of the Present Invention Related to the First Embodiment

By the methods shown in the first embodiments and using the raw materials shown in Table 1, the aluminum raw materials for sintering were prepared. Then, by using the aluminum bulk bodies and the aluminum raw materials for sintering having the compositions shown in Table 1, the porous aluminum complexes having the shape shown in FIG. 17 were produced.

The temperature conditions in the step of sintering (joining conditions) are shown in Table 1. The porous aluminum bodies had the dimension of: 50 mm of the diameter; and 40 mm of the length. The aluminum bulk bodies had the dimension of 50 mm of the diameter; and 40 mm of the thickness.

Examples (Exs.) 16-31 of the Present Invention Related to the Second Embodiment

Figure 17:
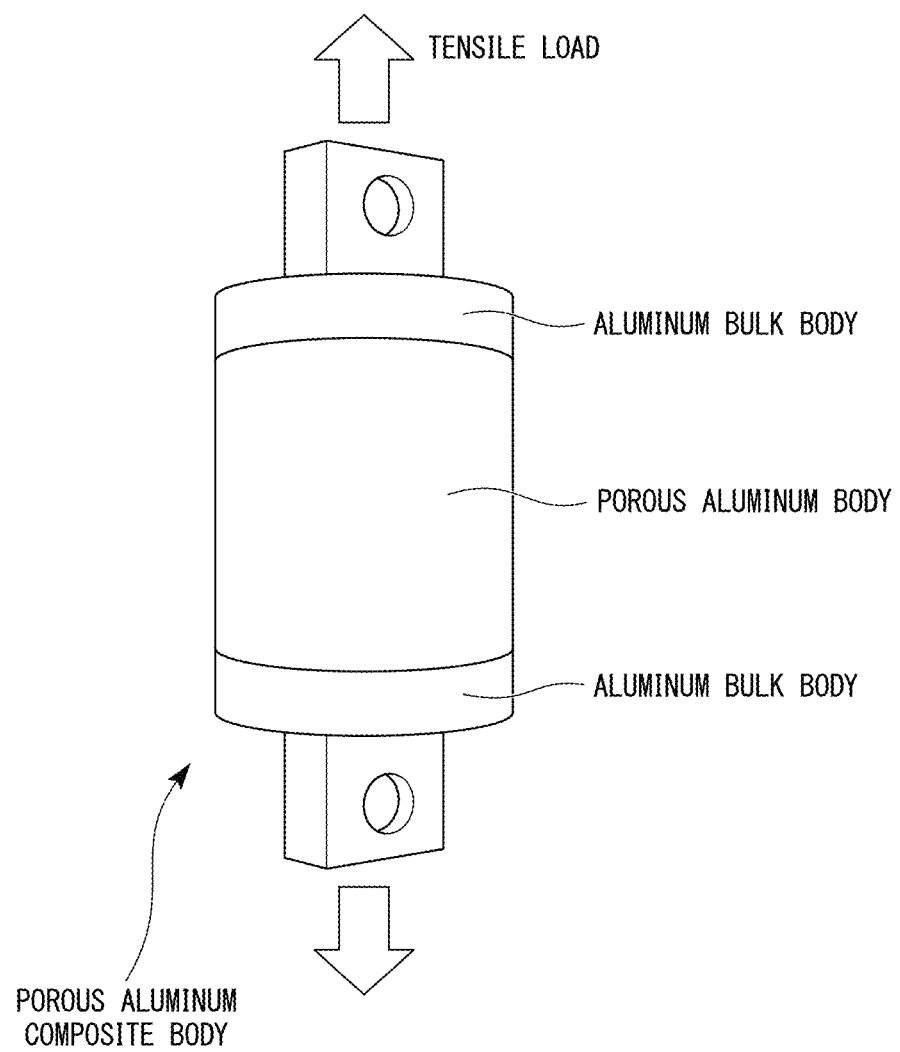
FIG. 17 is an external view of the porous aluminum complex prepared for the tensile test.

The aluminum bulk bodies and the porous aluminum bodies shown in Table 1 were joined by the method described in the second embodiment; and the porous aluminum complexes having the shape shown in FIG. 17 were produced. The compositions of the titanium-containing paste used in joining are shown in Table 1. In addition, the joining conditions are shown in Table 1. The porous aluminum bodies had the dimension of: 50 mm of the diameter; and 40 mm of the length. The aluminum bulk bodies had the dimension of: 50 mm of the diameter; and 40 mm of the thickness.

Comparative Examples 1 and 2

As Comparative Examples (C. Exs.) 1 and 2, the aluminum bulk bodies and the porous aluminum bodies shown in Table 1 were joined by using the Sn—0.7Cu-based eutectic brazing material, the melting point of which was about 230° C.; and the porous aluminum complexes having the shape shown in FIG. 17 were produced. The porous aluminum bodies had the dimension of: 50 mm of the diameter; and 40 mm of the length. The aluminum bulk bodies had the dimension of: 50 mm of the diameter; and 40 mm of the thickness.

The joint strength was evaluated by performing the tensile test on the obtained porous aluminum complexes. Evaluation results are shown in Table 1.

Metal Structure of the Junction

Identification and confirmation of the distribution state of the Ti—Al compound and the eutectic element compound including the eutectic element were performed by using the energy dispersive X-ray spectroscopy (EDX method) or the electron probe micro analyzer (EPMA method).

TABLE 1

| | | Aluminum bulk body | Aluminum raw material for sintering | | | | | | Composition of the titanium-containing paste | | | | | | Application amount based on the Ti amount | Sintering temperature | Apparent porosity | Tensile strength |
|---|---|---|---|---|---|---|---|---|---|---|---|---|---|---|---|---|---|---|
| | | | Aluminum substrate | | Titanium powder | | Eutectic element powder | | Titanium powder | | Eutectic element powder | | Binder* | | | | | |
| Embodiment | | Material | Material | (%) | Material | Content (mass %) | Material | Content (mass %) | Material | Content (mass %) | Material | Content (mass %) | Content (mass %) | amount (g/cm²) | (° C.) | (%) | (N/mm²) |
| Example of the present invention | First | 1 | A1070 | A1070 | 99 | Titanium | 1 | — | — | — | — | — | — | — | — | 657 | 71.9 | 122 |
| | | 2 | A1070 | A1070 | 95 | Titanium | 5 | — | — | — | — | — | — | — | — | 657 | 73.8 | 110 |
| | | 3 | A1070 | A1050 | 85 | Titanium | 15 | — | — | — | — | — | — | — | — | 657 | 72.1 | 124 |
| | | 4 | A3003 | A3003 | 94.5 | Titanium | 5 | Mg | 0.5 | — | — | — | — | — | — | 645 | 72.2 | 150 |
| | | 5 | A3003 | A3003 | 94 | Titanium | 5 | Mg | 1 | — | — | — | — | — | — | 645 | 73.5 | 126 |
| | | 6 | A3003 | A3003 | 90 | Titanium | 5 | Mg | 5 | — | — | — | — | — | — | 645 | 72.6 | 135 |
| | | 7 | A3003 | A3003 | 94.99 | Titanium hydride | 5 | Mg | 0.01 | — | — | — | — | — | — | 620 | 85.3 | 111 |
| | | 8 | A3003 | A3003 | 94.99 | Titanium hydride | 0.01 | Mg | 5 | — | — | — | — | — | — | 650 | 50.7 | 171 |
| | | 9 | A3003 | A5052 | 94.8 | Titanium | 5 | Ni | 0.2 | — | — | — | — | — | — | 640 | 73 | 114 |
| | | 10 | A3003 | A5052 | 94 | Titanium | 5 | Ni | 1 | — | — | — | — | — | — | 640 | 70.2 | 128 |
| | | 11 | A3003 | A5052 | 93 | Titanium | 5 | Ni | 2 | — | — | — | — | — | — | 640 | 68.9 | 138 |
| | | 12 | A1050 | A1050 | 99.98 | Titanium hydride | 0.01 | Si | 0.01 | — | — | — | — | — | — | 640 | 73.6 | 110 |
| | | 13 | A3003 | A3003 | 94 | Titanium | 5 | Si | 1 | — | — | — | — | — | — | 600 | 71.4 | 117 |
| | | 14 | A5052 | A5052 | 94 | Titanium | 1 | Si | 5 | — | — | — | — | — | — | 630 | 64.8 | 131 |
| | | 15 | A5052 | A5052 | 65 | Titanium | 20 | Si | 15 | — | — | — | — | — | — | 575 | 69.9 | 121 |
| | Second | 16 | A1070 | A1070 | 99 | Titanium | 1 | — | — | Titanium | 60 | — | — | 40 | 0.01 | 657 | 72.4 | 114 |
| | | 17 | A1070 | A1070 | 95 | Titanium | 5 | — | — | Titanium | 70 | — | — | 30 | 0.04 | 657 | 74.5 | 109 |
| | | 18 | A1070 | A1050 | 85 | Titanium | 15 | — | — | Titanium | 80 | — | — | 20 | 0.02 | 657 | 73 | 110 |
| | | 19 | A3003 | A3003 | 99.98 | Titanium hydride | 0.01 | Mg | 0.01 | Titanium hydride | 70 | Ni | 5 | 25 | 0.001 | 645 | 73.1 | 112 |

TABLE 1-continued

| | | | | Aluminum raw material for sintering | | | | Composition of the titanium-containing paste | | | | | Application amount based on the Ti amount | Sintering temperature | Apparent porosity | Tensile strength |
|---|---|---|---|---|---|---|---|---|---|---|---|---|---|---|---|---|
| | Aluminum bulk body | Aluminum substrate | Aluminum substrate | Titanium powder | Titanium powder | Eutectic element powder | Eutectic element powder | Titanium powder | Titanium powder | Eutectic element powder | Eutectic element powder | Binder* | | | | |
| Embodiment | Material | Material | (%) | Material | Content (mass %) | Material | Content (mass %) | Material | Content (mass %) | Material | Content (mass %) | Content (mass %) | (g/cm²) | (° C.) | (%) | (N/mm²) |
| 20 | A3003 | A3003 | 94.5 | Titanium | 5 | Mg | 0.5 | Titanium | 70 | Mg | 5 | 25 | 0.05 | 645 | 74.2 | 122 |
| 21 | A3003 | A3003 | 94 | Titanium | 5 | Mg | 1 | Titanium | 70 | Mg | 10 | 20 | 0.03 | 645 | 75.5 | 115 |
| 22 | A3003 | A3003 | 90 | Titanium | 5 | Mg | 5 | Titanium | 70 | Mg | 10 | 20 | 0.04 | 645 | 76.8 | 108 |
| 23 | A3003 | A5052 | 99.49 | Titanium hydride | 0.5 | Ni | 0.01 | Titanium | 70 | Mg | 3 | 27 | 0.005 | 640 | 73.1 | 115 |
| 24 | A3003 | A5052 | 94.8 | Titanium hydride | 5 | Ni | 0.2 | Titanium | 70 | Ni | 3 | 27 | 0.05 | 640 | 72.4 | 119 |
| 25 | A3003 | A5052 | 94 | Titanium hydride | 5 | Ni | 1 | Titanium | 70 | Ni | 7 | 23 | 0.02 | 640 | 71 | 122 |
| 26 | A3003 | A5052 | 93 | Titanium hydride | 5 | Ni | 2 | Titanium | 70 | Ni | 10 | 20 | 0.03 | 640 | 70.4 | 115 |
| 27 | A5052 | A5052 | 75 | Titanium hydride | 20 | Ni | 5 | Titanium hydride | 70 | Ni | 10 | 20 | 0.0005 | 645 | 71.4 | 111 |
| 28 | A1050 | A1050 | 94.9 | Titanium hydride | 5 | Cu | 0.01 | Titanium hydride | 70 | Cu | 5 | 25 | 0.01 | 640 | 72.8 | 116 |
| 29 | A3003 | A3003 | 94 | Titanium hydride | 5 | Cu | 1 | Titanium hydride | 70 | Ni | 10 | 20 | 0.004 | 610 | 78.9 | 118 |
| 30 | A5052 | A5052 | 94 | Titanium hydride | 1 | Cu | 5 | Titanium hydride | 70 | Mg | 10 | 20 | 0.008 | 657 | 60.3 | 141 |
| 31 | A5052 | A5052 | 90 | Titanium hydride | 5 | Cu | 5 | Titanium hydride | 70 | Mg | 10 | 20 | 0.008 | 600 | 80.3 | 103 |
| C. Ex. 1 | A1070 | A1070 | 95 | Titanium | 5 | — | — | Sn-0.7 Cu-based eutectic brazing material | | | | | | 657 | 73.6 | 40 |
| C. Ex. 2 | A3003 | A3003 | 95 | Titanium | 5 | — | — | Sn-0.7 Cu-based eutectic brazing material | | | | | | 645 | 73.6 | 33 |

*Acryl 10% IPA solution

As shown in Table 1, the tensile strength in Comparative Examples 1 and 2, in which the aluminum bulk bodies and the porous aluminum bodies were joined by using the Sn-based brazing material, was low and 40N/cm² or less.

Contrary to that, it was confirmed that the tensile strength was high and 110N/cm² or more in Examples 1-15 of the present invention, which were integrally sintered by using the aluminum bulk bodies and the aluminum raw materials for sintering including the titanium powders.

In addition, in Examples 16-31 of the present invention, in which the aluminum bulk bodies and the porous aluminum bodies were joined by applying the titanium-containing paste, it was confirmed that the tensile strength was high and 100N/cm² or more.

Based on the above-explained results, according to the present invention, the porous aluminum complex, in which the aluminum bulk body and the porous aluminum body are joined strongly, can be provided.

REFERENCE SIGNS LIST

10: Porous aluminum complex
15: Junction
16: Ti—Al compound
17: Eutectic element compound
20: Aluminum multi-port tube (Aluminum bulk body)
30: Porous aluminum sintered compact (Porous aluminum body)
31: Aluminum substrate
31a: Aluminum fiber
31b: Aluminum powder
40: Aluminum raw material for sintering
42: Titanium powder grain

What is claimed is:

1. A porous aluminum complex comprising: a porous aluminum body made of aluminum or aluminum alloy; and an aluminum bulk body made of aluminum or aluminum alloy, the porous aluminum body and the aluminum bulk body being joined to each other, wherein
   a junction between the porous aluminum body and the aluminum bulk body includes a Ti—Al compound,
   the porous aluminum body is formed by sintering a plurality of aluminum substrates,
   the aluminum substrates are made of aluminum fibers or both of the aluminum fibers and an aluminum powder,
   a plurality of pillar-shaped protrusions projecting toward an outside are formed on outer surfaces of one of or both of the porous aluminum body and the aluminum bulk body, and at least one of the pillar-shaped protrusions include the junction, and
   at least one of the plurality of pillar-shaped protrusions is not, or is not proximate to, a junction that bonds the aluminum substrates, and only projects from one of the aluminum substrates.

2. The porous aluminum complex according to claim 1, wherein the Ti—Al compound is $Al_3Ti$.

3. The porous aluminum complex according to claim 1, wherein the junction further includes a eutectic element compound including a eutectic element capable of eutectic reaction with Al.

4. The porous aluminum complex according to claim 1, wherein
   a substrate junction, in which the aluminum substrates are bonded to each other, includes a Ti—Al compound.

5. The porous aluminum complex according to claim 1, wherein a porosity of the porous aluminum body is in a range of 30% or more and 90% or less.

6. A method of producing the porous aluminum complex according to claim 1 in which the porous aluminum body and the aluminum bulk body are bonded to each other, the method comprising the steps of:
   heating the porous aluminum body and the aluminum bulk body after interposing a titanium powder made of any one of or both of a metal titanium powder and a titanium hydride powder between the porous aluminum body and the aluminum bulk body; and
   bonding the porous aluminum body and the aluminum bulk body through pillar-shaped projections after forming the plurality of the pillar-shaped protrusions projecting toward an outside on outer surfaces of one of or both of the porous aluminum body and the aluminum bulk body, wherein
   the porous aluminum body is formed by sintering a plurality of aluminum substrates, and
   the aluminum substrates are made of aluminum fibers or both of the aluminum fibers and an aluminum powder.

7. The method of producing the porous aluminum complex according to claim 6, wherein a eutectic element powder made of a eutectic element capable of eutectic reaction with Al is interposed between the porous aluminum body and the aluminum bulk body in addition to the titanium powder.

8. The method of producing the porous aluminum complex according to claim 6, wherein
   formation of the porous aluminum body and bonding the porous aluminum body and the aluminum bulk body are performed by:
   forming an aluminum raw material for sintering by adhering the titanium powder on outer surfaces of the aluminum substrates;
   contacting the aluminum raw material for sintering and the aluminum bulk body; and
   sintering the aluminum raw material for sintering and the aluminum bulk body by heating.

9. The method of producing the porous aluminum complex according to claim 8, wherein a content amount of the titanium powder in the aluminum raw material for sintering is set in a range of 0.01 mass % or more and 20 mass % or less.

10. The method of producing the porous aluminum complex according to claim 6, wherein
    the titanium powder is interposed between the porous aluminum body and the aluminum bulk body by applying a titanium mixture, in which the titanium powder and a binder is mixed, on the outer surfaces of one of or both of the porous aluminum body and the aluminum bulk body.

11. The method of producing the porous aluminum complex according to claim 10, wherein an application amount of the titanium mixture applied on the outer surfaces of one of or both of the porous aluminum body and the aluminum bulk body is set in a range of 0.0005 g/cm² or more and 0.05 g/cm² or less based on a titanium amount.

12. The method of producing the porous aluminum complex according to claim 10, wherein the titanium mixture includes a eutectic element powder capable of eutectic reaction with Al.

* * * * *